US012561006B2

(12) United States Patent
Choi et al.

(10) Patent No.: US 12,561,006 B2
(45) Date of Patent: Feb. 24, 2026

(54) DISPLAY APPARATUS FOR GESTURE RECOGNITION AND OPERATING METHOD THEREOF

(71) Applicant: SAMSUNG ELECTRONICS CO., LTD., Suwon-si (KR)

(72) Inventors: Kilsoo Choi, Suwon-si (KR); Sehyun Kim, Suwon-si (KR); Hyeeun Park, Suwon-si (KR); Yongwoo Shin, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 18/242,890

(22) Filed: Sep. 6, 2023

(65) Prior Publication Data

US 2025/0068249 A1      Feb. 27, 2025

Related U.S. Application Data

(63) Continuation of application No. PCT/KR2023/012676, filed on Aug. 25, 2023.

(30) Foreign Application Priority Data

Aug. 25, 2023      (KR) ........................ 10-2022-0107163

(51) Int. Cl.
*G06V 40/20*          (2022.01)
*G06F 3/01*           (2006.01)
(Continued)

(52) U.S. Cl.
CPC .............. *G06F 3/017* (2013.01); *G06V 40/10* (2022.01); *G06V 40/28* (2022.01); *H04N 23/69* (2023.01)

(58) Field of Classification Search
CPC ........ G06F 3/017; G06V 40/10; G06V 40/28; G06V 40/20; H04N 23/69; H04N 7/14; H04N 23/611; H04N 7/142
See application file for complete search history.

(56) References Cited

U.S. PATENT DOCUMENTS 9,749,582 B2      8/2017      Jeong et al.
9,990,757 B2      6/2018      Deng et al.
(Continued)

FOREIGN PATENT DOCUMENTS

JP          2012-68713 A          4/2012
JP          2020-144551 A          9/2020
(Continued)

OTHER PUBLICATIONS

Communication dated Nov. 24, 2023, issued by the International Searching Authority in counterpart International Application No. PCT/KR2023/012676 (PCT/ISA/220, PCT/ISA/210, and PCT/ISA/237).

(Continued)

*Primary Examiner* — Rinna Yi
(74) *Attorney, Agent, or Firm* — Sughrue Mion, PLLC

(57) ABSTRACT

A display apparatus includes: a display; a communicator, a memory storing one or more instructions; and at least one processor configured to execute the one or more instructions. The at least one processor is configured to execute the one or more instructions to: identify a transmission area and a gesture recognition area in an image area of a first image captured by a camera for a video call; control the communicator to transmit a second image corresponding to the transmission area to a counterpart display apparatus participating in the video call, in order to provide a video call service; perform gesture recognition in a third image corresponding to the gesture recognition area; and perform a (Continued)

function corresponding to a recognized gesture from the gesture recognition in the third image.

20 Claims, 15 Drawing Sheets

(51) Int. Cl.
  *G06V 40/10*      (2022.01)
  *H04N 23/69*      (2023.01)

(56)            References Cited

U.S. PATENT DOCUMENTS

| | | | |
|---|---|---|---|
| 10,782,788 B2 | 9/2020 | Sakai et al. | |
| 11,140,356 B2 | 10/2021 | Ahn et al. | |
| 11,503,524 B2 | 11/2022 | Cho et al. | |
| 2009/0309897 A1* | 12/2009 | Morita | H04N 7/147 |
| | | | 345/660 |
| 2011/0085028 A1* | 4/2011 | Samadani | G06V 40/162 |
| | | | 348/51 |
| 2014/0028546 A1* | 1/2014 | Jeon | G06F 3/04842 |
| | | | 345/156 |
| 2014/0184726 A1 | 7/2014 | Kim et al. | |
| 2016/0239098 A1* | 8/2016 | Sakai | G06V 40/28 |
| 2016/0364102 A1 | 12/2016 | Galant et al. | |
| 2018/0033149 A1* | 2/2018 | Jeong | G06V 40/103 |
| 2018/0053043 A1 | 2/2018 | Lawrence | |
| 2022/0198774 A1 | 6/2022 | Wang et al. | |
| 2023/0209204 A1* | 6/2023 | Zu | G06V 40/168 |
| | | | 348/207.99 |
| 2023/0386162 A1* | 11/2023 | Agrawal | G06V 10/25 |
| 2025/0080831 A1* | 3/2025 | Guo | H04N 23/64 |
| 2025/0182500 A1* | 6/2025 | Peng | G06V 20/593 |

FOREIGN PATENT DOCUMENTS

| | | | |
|---|---|---|---|
| KR | 10-2008-0044379 A | 5/2008 | |
| KR | 10-1172268 B1 | 8/2012 | |
| KR | 10-2014-0088452 A | 7/2014 | |
| KR | 10-1470442 B1 | 12/2014 | |
| KR | 10-2015-0128386 A | 11/2015 | |
| KR | 10-1888492 B1 | 8/2018 | |
| KR | 10-2044242 B1 | 11/2019 | |
| KR | 10-2191177 B1 | 12/2020 | |
| KR | 10-2022-0013235 A | 2/2022 | |
| KR | 10-2022-0032867 A | 3/2022 | |
| WO | 2021/121302 A1 | 6/2021 | |

OTHER PUBLICATIONS

Extended European Search Report dated Jul. 7, 2025, issued by the European Patent Office in European Application No. 23857793.6.

* cited by examiner

FIG. 12

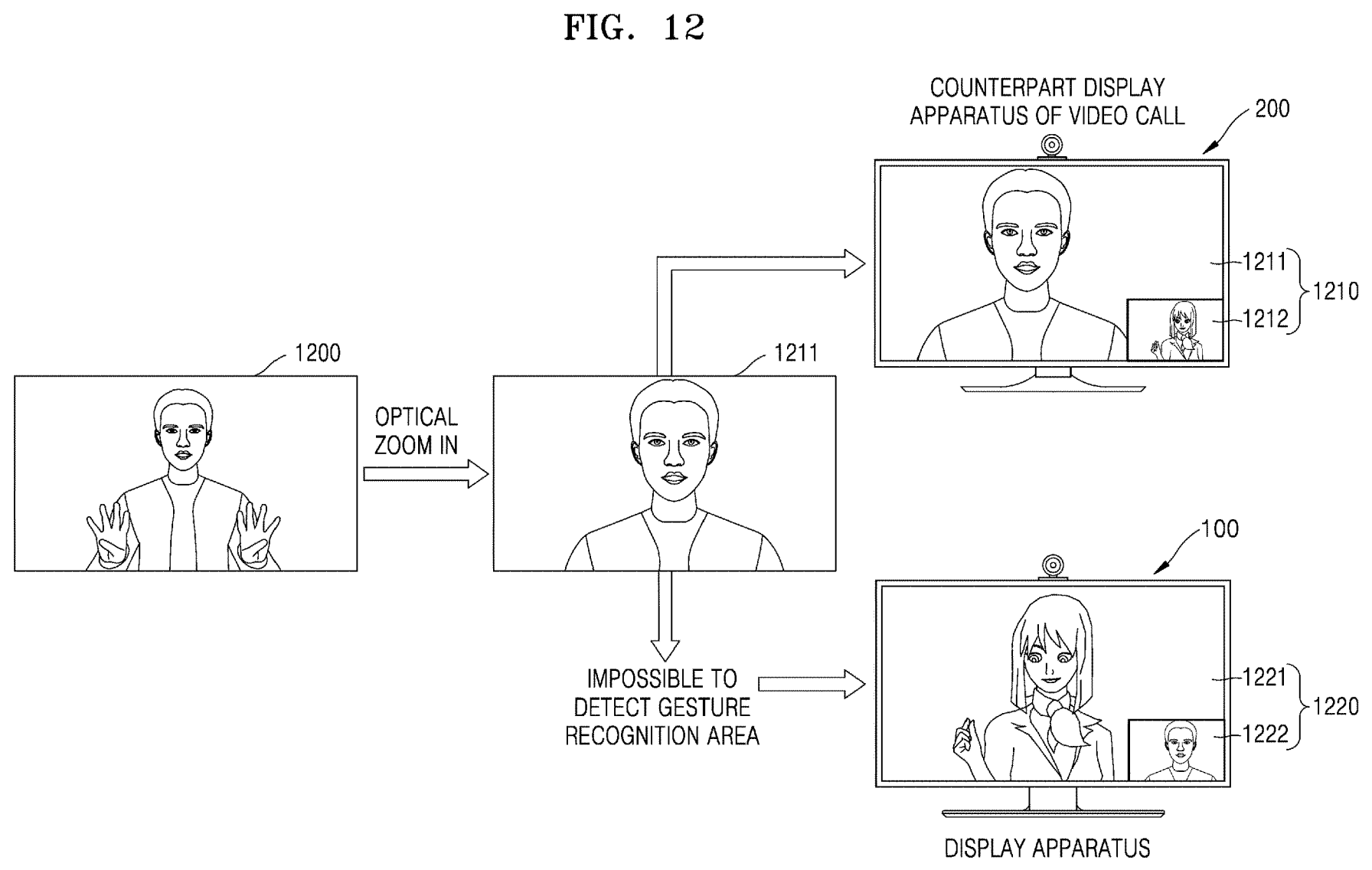

COUNTERPART DISPLAY APPARATUS OF VIDEO CALL

DISPLAY APPARATUS

OPTICAL ZOOM IN

IMPOSSIBLE TO DETECT GESTURE RECOGNITION AREA

DISPLAY APPARATUS FOR GESTURE RECOGNITION AND OPERATING METHOD THEREOF

CROSS-REFERENCE TO RELATED APPLICATION(S)

This application is a bypass continuation of International Application No. PCT/KR2023/012676, filed on Aug. 25, 2023, which is based on and claims priority to Korean Patent Application No. 10-2022-0107163, filed on Aug. 25, 2022, in the Korean Intellectual Property Office, the disclosures of which are incorporated by reference herein in their entireties.

TECHNICAL FIELD

The disclosed embodiments relate to a display apparatus for providing a video call service and an operating method of the display apparatus, and more particularly, to a display apparatus for relatively more effectively performing a gesture recognition function while providing a video call service, and an operating method of the display apparatus.

BACKGROUND

As wired or wireless communication networks and communication technologies have developed, the usage of video call services between electronic devices has increased. Specifically, video call services between the electronic devices have been widely used for non-contact communication between different users in remote locations.

For example, in a video call service, an electronic device and another electronic device may be connected to each other through wired or wireless communication networks. The electronic devices may include all electronic devices which include displays for providing video call screens and capable of performing communication with other electronic devices in remote locations by accessing wired or wireless communication networks. For example, the electronic devices may include, for example, portable computers (e.g., notebook computers, netbook computers, or tablet personal computers (PCs)), portable terminals (e.g., smartphones or personal digital assistants (PDAs)), analog televisions (TVs), or digital TVs.

When a video call is performed between a plurality of electronic devices (e.g., a first electronic device and a second electronic device), the first electronic device may obtain an image with respect to a first user and transmit the obtained image to the second electronic device. Also, the second electronic device may obtain an image with respect to a second user and transmit the obtained image to the first electronic device. Accordingly, the first electronic device and the second electronic device may respectively display video call screens including the images with respect to the first user and the second user. By doing so, each of the first user and the second user may perform the call while viewing the image with respect to the other party in locations remote from each other.

SUMMARY

According to the disclosed embodiments, there are provided a display apparatus for providing a video call service and an operating method of the display apparatus.

Particularly, there are provided a display apparatus for relatively more effectively performing a gesture recognition function while providing a video call service, and an operating method of the display apparatus.

A display apparatus may include: a display; a communicator; a memory storing one or more instructions; and at least one processor configured to execute the one or more instructions. The at least one processor may be configured to execute the one or more instructions to identify a transmission area and a gesture recognition area in an image area of a first image captured by a camera for a video call. The at least one processor may be configured to execute the one or more instructions to control the communicator to transmit a second image corresponding to the transmission area to a counterpart display apparatus participating in the video call, in order to provide a video call service. The at least one processor may be configured to execute the one or more instructions to perform gesture recognition in a third image corresponding to the gesture recognition area. The at least one processor may be configured to execute the one or more instructions to perform a function corresponding to a recognized gesture from the gesture recognition in the third image.

The at least one processor is configured to execute the one or more instructions to identify the gesture recognition area by detecting the gesture recognition area in a specified position of the image area.

The at least one processor is configured to execute the one or more instructions to identify the gesture recognition area by: detecting a hand of a user in the image area; and determining the gesture recognition area based on an area in which the hand is detected.

The at least one processor may be further configured to execute the one or more instructions to: provide a user interface on the display to adjust the gesture recognition area; and adjust the gesture recognition area based on a user input received through the user interface.

The at least one processor is configured to execute the one or more instructions to perform the gesture recognition in the third image by performing the gesture recognition according to a specified event while the video call service is being provided. The specified event may include at least one of (i) a user input of selecting the gesture recognition function or (ii) a detection of a motion exceeding a threshold value in the image area.

The at least one processor may be further configured to execute the one or more instructions to, based on a zoom-in function being executed while the gesture recognition function is provided while the video call service is being provided, identify a category of the zoom-in function.

The at least one processor may be further configured to execute the one or more instructions to: based on the category of the zoom-in function being identified as an optical zoom-in, output a message to the display indicating that the gesture recognition function has been terminated, and based on the category of the zoom-in function being identified as digital zoom-in, expand the second image corresponding to the transmission area and control the communicator to transmit, to the counterpart display apparatus participating in the video call, expanded second image, perform the gesture recognition in the third image corresponding to the gesture recognition area, and perform the function corresponding to the recognized gesture from the gesture recognition in the third image.

The camera may include a non-zoom camera and a zoom camera. The at least one processor may be further configured to execute the one or more instructions to, based on a zoom-in function being executed while the gesture recognition function is provided while the video call service is being provided, switch the non-zoom camera capturing the first image for the video call to the zoom camera for capturing an expanded first image.

The at least one processor may be further configured to execute the one or more instructions to, provide a gesture guide that provides one or more gestures and a function corresponding to each of the one more gestures, in order to guide the user with available gestures.

An operating method of a display apparatus may include: identifying a transmission area and a gesture recognition area in an image area of a first image captured by a camera for a video call; transmitting a second image corresponding to the transmission area to a counterpart display apparatus participating in the video call, in order to provide a video call service; performing gesture recognition in a third image corresponding to the gesture recognition area; and performing a function corresponding to a recognized gesture from the gesture recognition in the third image.

The identifying the gesture recognition area may include identifying the gesture recognition area in a specified position of the image area.

The identifying the gesture recognition area may include: detecting a hand of a user in the image area; and determining the gesture recognition area based on an area in which the hand is detected.

The operating method may further include: providing a user interface on a display to adjust the gesture recognition area; and adjusting the gesture recognition area based on a user input received through the user interface.

The performing the gesture recognition in the third image may include performing the gesture recognition according to a specified event while the video call service is being provided. The specified event may include at least one of (i) a user input of selecting the gesture recognition function or (ii) a detection of a motion exceeding a threshold value in the image area.

The operating method may further include, based on a zoom-in function being executed while the gesture recognition function is provided while the video call service is being provided, identify a category of the zoom-in function.

The operating method may further include, based on the category of the zoom-in function being identified as an optical zoom-in, outputting a message to the display indicating that the gesture recognition function has been terminated, and based on the category of the zoom-in function being identified as digital zoom-in, expanding the second image corresponding to the transmission area and transmitting, to the counterpart display apparatus participating in the video call, expanded second image, performing the gesture recognition in the third image corresponding to the gesture recognition area, and performing the function corresponding to the recognized gesture from the gesture recognition in the third image.

The camera may include a non-zoom camera and a zoom camera. The operating method may further include, based on a zoom-in function being executed while the gesture recognition function is provided while the video call service is being provided, switching the non-zoom camera capturing the first image for the video call to the zoom camera for capturing an expanded first image.

The operating method may further include providing a gesture guide that provides one or more gestures and a function corresponding to each of the one more gestures, in order to guide the user with available gestures.

A non-transitory computer-readable recording medium may have stored therein a program for executing an operating method of a display apparatus. The operating method may include: identifying a transmission area and a gesture recognition area in an image area of a first image captured by a camera for a video call; transmitting a second image corresponding to the transmission area to a counterpart display apparatus participating in the video call, in order to provide a video call service; performing gesture recognition in a third image corresponding to the gesture recognition area; and performing a function corresponding to a recognized gesture from the gesture recognition in the third image.

The identifying the gesture recognition area may include: detecting a hand of a user in the image area; and determining the gesture recognition area based on an area in which the hand is detected.

According to a display apparatus and an operating method thereof, a gesture recognition function may be performed while a video call service is provided.

Particularly, according to a display apparatus and an operating method thereof, a video call service may be effectively provided while a gesture recognition function is performed.

Particularly, according to a display apparatus and an operating method thereof, user satisfaction may be increased by making a body portion of a user for gesture recognition invisible on a video call screen.

BRIEF DESCRIPTION OF THE DRAWINGS

The disclosure may be easily understood based on the combination of the following detailed descriptions and the accompanying drawings, and reference numerals indicate structural elements.

5 6

Figure 11:
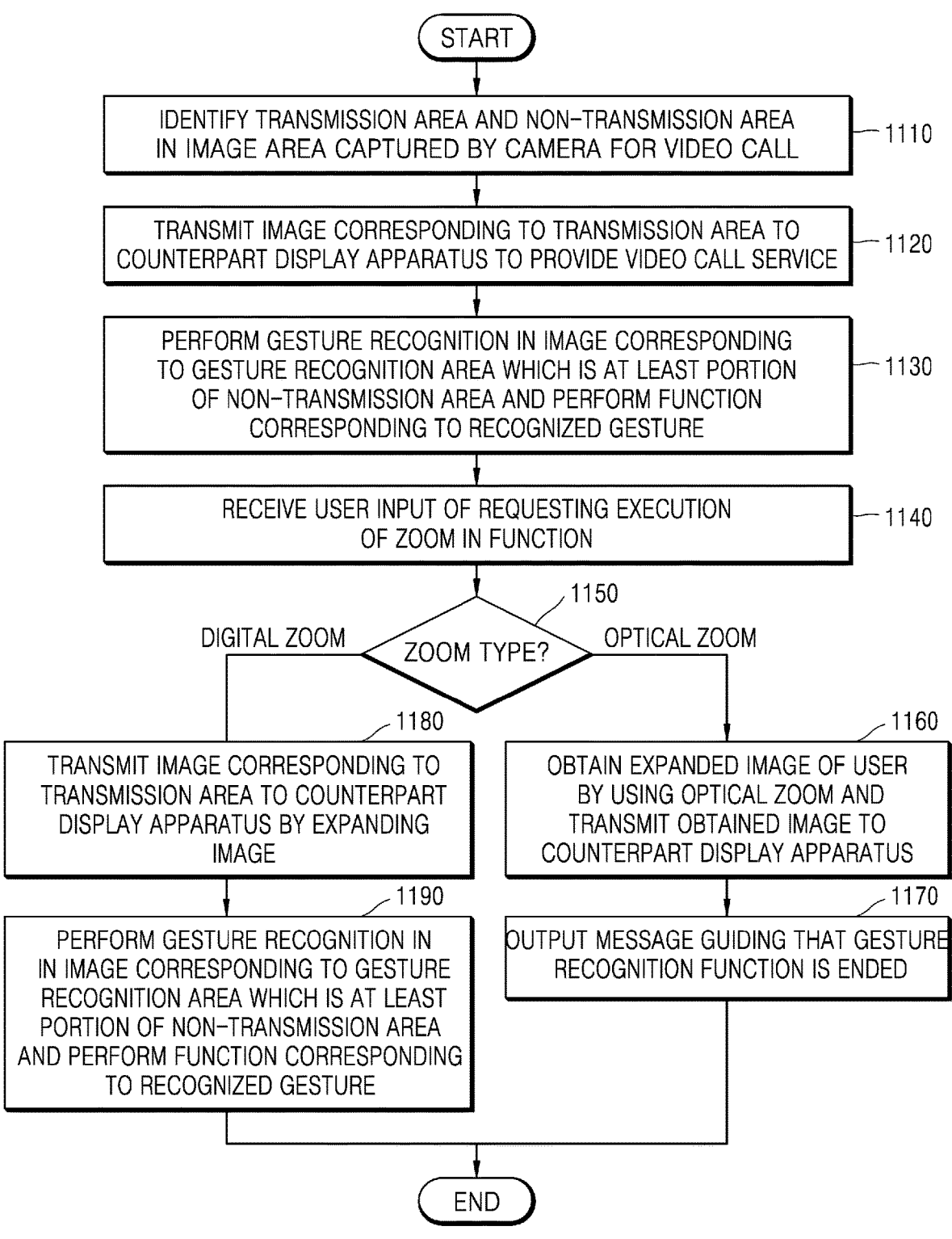

FIG. 11 is an example of a flowchart of a method, performed by a display apparatus, of performing an operation corresponding to a zoom-in input, while the display apparatus is providing a video call service and a gesture recognition function, according to an embodiment of the disclosure.

FIG. 12 is a reference diagram for describing an operating method of a data processing device, when a zoom type is optical zoom-in, according to an embodiment of the disclosure.

Figure 13:
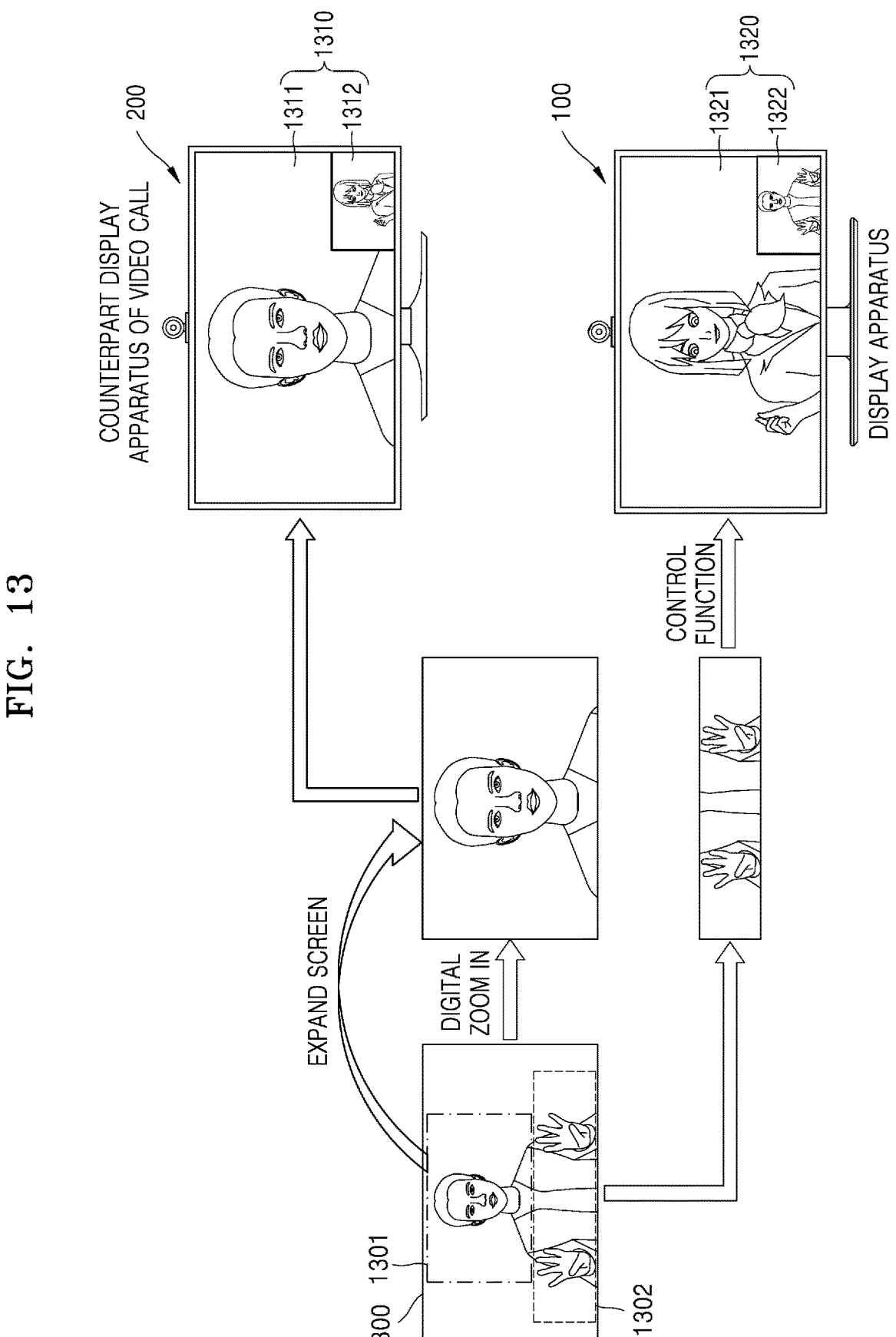

FIG. 13 is a reference diagram for describing an operating method of a data processing device, when a zoom type is digital zoom-in, according to an embodiment of the disclosure.

Figure 14:
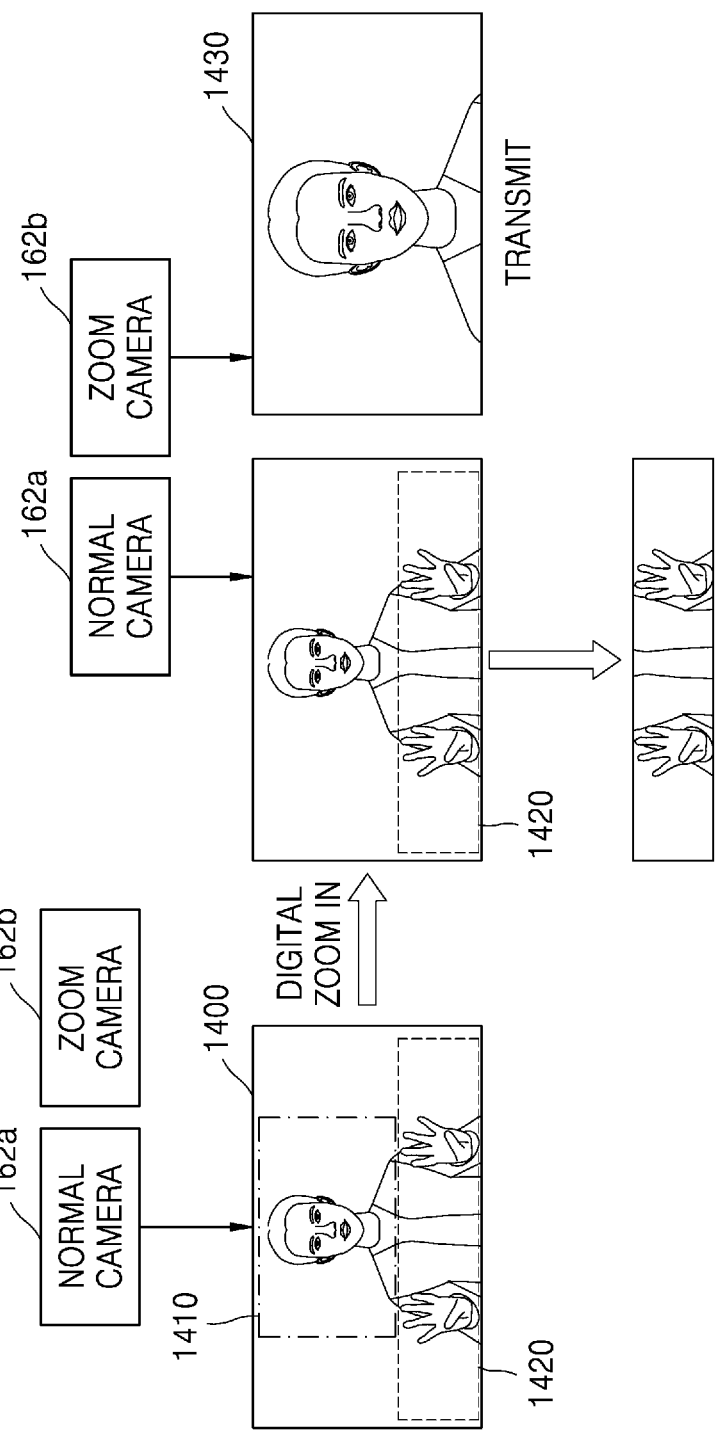

FIG. 14 is a reference diagram for describing an operating method of a display apparatus, when the display apparatus includes two cameras, according to an embodiment of the disclosure.

Figure 15:
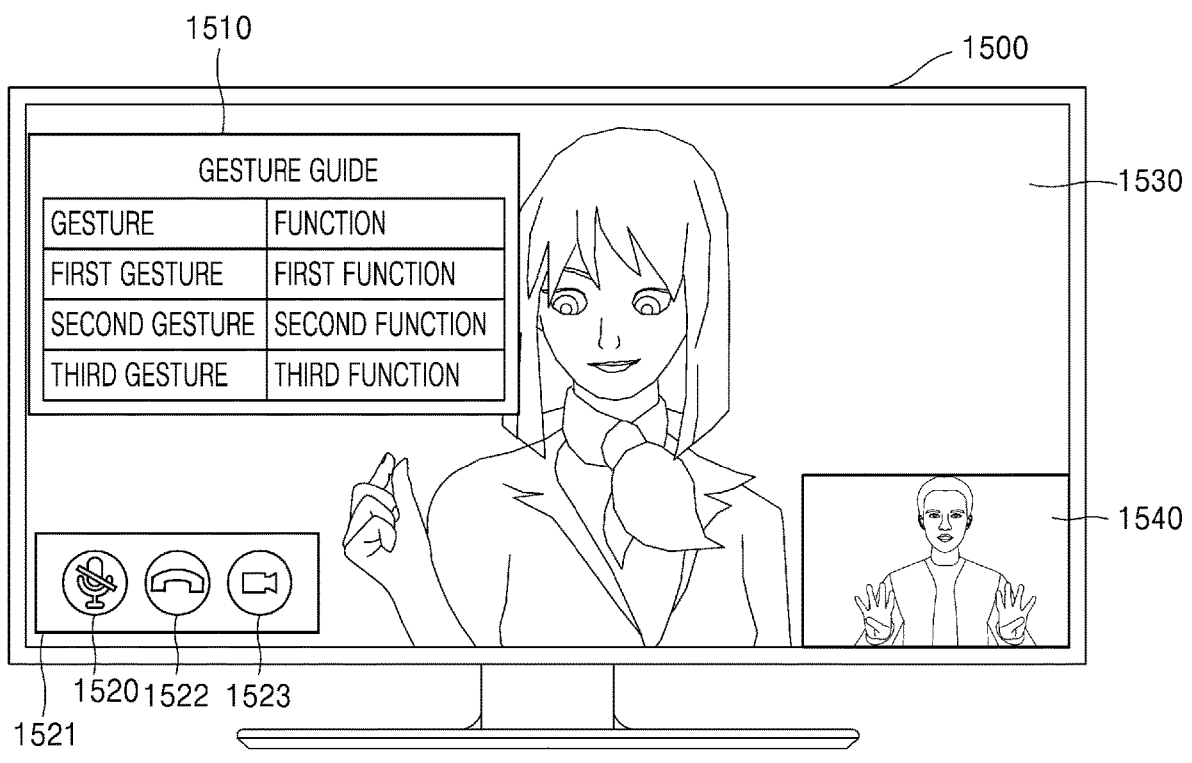

FIG. 15 illustrates an example of a user interface of a display apparatus which is capable of providing a gesture recognition function while providing a video call service, according to an embodiment of the disclosure.

DETAILED DESCRIPTION

Hereinafter, embodiments will be described in detail with reference to the accompanying drawings for one of ordinary skill in the art to easily execute the embodiments. However, the disclosed embodiments may have different forms and should not be construed as being limited to the embodiments described herein. Also, in the drawings, parts not related to descriptions are omitted for clear descriptions, and throughout the specification, similar reference numerals are used for similar elements. Also, throughout the drawings, the same reference numerals are used for the same elements.

Throughout the specification, when a part is referred to as being "connected" to other parts, the part may be "directly connected" to the other parts or may be "electrically connected" to the other parts with other devices therebetween. Also, when a part "includes" a certain element, unless it is specifically mentioned otherwise, the part may further include another component and may not exclude the other component.

The expression "according to an embodiment, "according to an embodiment of the disclosure, "according to some embodiments," or "according to one or more embodiments," written in various parts of the specification, does not necessarily refer to the same embodiment.

One or more embodiments may be indicated as functional block components and various processing operations. Part or all of such functional blocks may be realized by various numbers of hardware and/or software components configured to perform specified functions. For example, the functional blocks may be realized by one or more processors or micro-processors or by circuit structures for performing intended functions. Also, for example, the functional blocks may be realized by various programming or scripting languages. The functional blocks may be realized by algorithms executed by one or more processors. Furthermore, the disclosed embodiments could employ conventional techniques for electronics configuration, signal processing and/or data control. Terms such as "module," "component," etc. may be broadly used and are not limited to mechanical or physical components.

In addition, connection lines or connection members between components illustrated in the drawings are intended to represent example functional connections and/or physical or logical connections between the components. It should be noted that many alternative or additional functional connections, physical connections or logical connections may be present in a practical device.

Also, the expression "at least one of A, B, or C" indicates any one of "A," "B," "C," "A and B," "A and C," "B and C," and "A, B, and C."

A display apparatus and an operating method thereof are described. Particularly, an operating method, performed by a display apparatus for displaying a multi-view screen, of processing a video call request, when a video call is requested between a plurality of electronic devices, and the display apparatus for performing the operating method are described.

An electronic device capable of providing a video call service may include all types of electronic devices which include a display for displaying a video call screen and are capable of performing communication with other electronic devices in remote locations by accessing wired or wireless communication networks. Also, the electronic device may include various types of computing devices including displays and capable of providing video call services. For example, the electronic device may include, for example, a wearable device, a smartphone, a personal digital assistant (PDA), a media player, a tablet personal computer (PC), a laptop computer, a media player, a television (TV), a digital TV, a smart TV, a digital signage, and a digital board, but is not limited thereto. Hereinafter, for convenience of explanation, an electronic device capable of providing a video call service will be referred to as a "display apparatus."

Hereinafter, in the accompanying drawings, the display apparatus is illustrated and described as a TV, for example. Also, in the accompanying drawings, the same elements are indicated by using the same reference numerals. Also, throughout the detailed descriptions, the same elements are described by using the same terms.

Hereinafter, a display apparatus and an operating method thereof will be described in detail by referring to the accompanying drawings.

Figure 1:
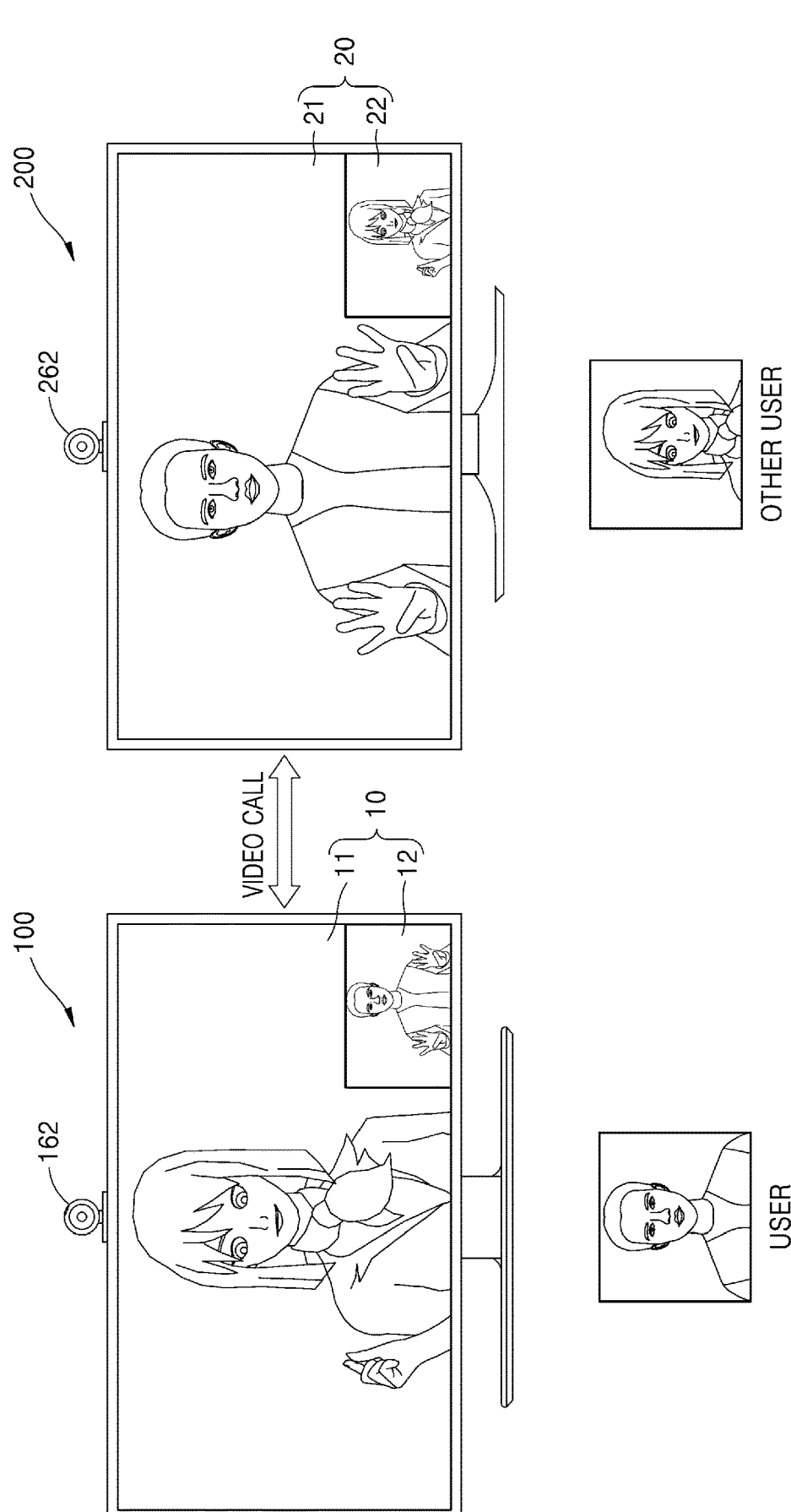
FIG. 1 is a reference diagram for describing a method of providing a video call service via two display apparatuses, according to an embodiment of the disclosure.

FIG. 1 is a reference diagram for describing a method of providing a video call service via two display apparatuses, according to an embodiment of the disclosure.

Referring to FIG. 1, the two display apparatuses, that is, a first display apparatus 100 and a second display apparatus 200 may provide a video call service by using a video call application. An application may denote a program or a processor for performing a service, a function, or a specified operation. In detail, an application may be formed of at least one instruction for performing a service, a function, or a specified operation. The application for performing a video call service or function or video call operations may be referred to as a video call application.

A video call may refer to an operation in which each of a plurality of users in remote locations makes a phone call with the other party through a plurality of electronic devices, while viewing a face of the other party on a screen. Also, the "video call" described may be implemented in all the fields, such as a video conference, non-contact communication, and/or non-contact education, where remote users perform communication by receiving images with respect to the other parties, and the "video call" may refer to all the cases where a plurality of remote users perform communication while viewing images with respect to the other parties. The images included in the video call screen may not necessarily have to be the face of a user using the video call. Rather, the images may also include, for example, an image indicating an environment of the user using the video call, and/or an image provided by the user.

Generally, a video call may be performed between two different electronic devices. Alternatively, three or more users in locations remote to one another may perform a video call through three or more electronic devices.

Hereinafter, a case where a user (hereinafter, a "user") and another user (hereinafter, "the other party") perform a video call through two electronic devices remotely located from each other is described and illustrated as an example. The user may not refer to a single person, but may refer to a plurality of persons, and the other party may also refer to a plurality of persons.

Referring to FIG. 1, a video call may be performed between the first display apparatus 100 and the second display apparatus 200 that are electronic devices in remote locations. Also, the video call may be performed by transmitting and receiving data required for the video call by using a communication network, such as third generation (3G), fourth generation (4G), or fifth generation (5G). Alternatively, the video call may be performed through a call service of a communication operator. Also, the video call may be performed through a specified application (for example, a video call application, a non-contact communication application, a video education application, and/or a video conference application) provided through a server of a service provider.

In the descriptions hereinafter including FIG. 1, an electronic device of the user will be referred to as a display apparatus 100, and an electronic device of the other party to perform a video call with the user will be referred to as the counterpart display apparatus 200. Alternatively, the electronic device of the user may be simply referred to as a first display apparatus, and the electronic device of the other party may be simply referred to as a second display apparatus. Also, the user of the display apparatus 100 will be just referred to as a user, and the other party to perform the video call with the user will be referred to as the other user. Also, the user and the other user may also be referred to as a first user and a second user, respectively. In addition, in FIG. 1, the display apparatuses are described as examples of the electronic devices of the user and the other user. However, the electronic devices may also be various types of electronic devices, such as smartphones.

Referring to FIG. 1, the display apparatus 100 may perform a video call with the counterpart display apparatus 200 that is an electronic device of the other party in a remote location. The display apparatus 100 may perform the video call by directly executing its call function or by executing an application for non-contact communication. As described above, the display apparatus 100 may directly perform the video call with the counterpart display apparatus 200 by using its video call service function.

The display apparatus 100 may transmit a video call request to the counterpart display apparatus 200, or the counterpart display apparatus 200 may transmit a video call request to the display apparatus 100. For example, when the user of the display apparatus 100 wants to perform a video call, the user may input, to the display apparatus 100, a user input for selecting an application, a program, or a menu for providing a video call service of the display apparatus 100. Then, the display apparatus 100 may recognize based on the user input that a video call request is received.

When the video call is started, the display apparatus 100 and the counterpart display apparatus 200 performing the video call may display video call screens. For example, the display apparatus 100 of the user may display a video call screen 10 by including an image with respect to the other party on a main screen 11 and an image with respect to the user on a sub-screen 12. Also, the video call screen 10 may further include menus for controlling the video call. Also, a display of the counterpart display apparatus 200 may display a video call screen 20 by including an image of the user on a main screen 21 and an image of the other party on a sub-screen 22. Also, the video call screen 20 may further include menus for controlling the video call. For example, when the video call request is started by the display apparatus 100, a camera 162 of the display apparatus 100 may photograph the user and transmit an image of the user to the counterpart display apparatus 200, and the counterpart display apparatus 200 receiving the video call request may photograph the other party by using a camera 262 and transmit an image of the other party to the display apparatus 100. As described above, the video call screens 10 and 20 may include each of the image with respect to the user and the image with respect to the other party, the user and the other party using a video call service, and image signals corresponding to the video call screens 10 and 20 may include image signals having a specified resolution.

As described above, while the video call is performed between the user of the display apparatus 100 and the other user of the counterpart display apparatus 200, when the user uses a gesture recognition function of the display apparatus 100, the user may make various gestures by using a hand, in order to use the gesture recognition function. The gesture recognition function may refer to a function, according to which the display apparatus 100 recognizes a gesture of the user when the user makes a gesture by using a body part, such as a hand, and the display apparatus 100 performs a function mapped to the recognized gesture. Thus, the user may make a specified gesture to trigger a specified function corresponding to the gesture. For example, the user may make the gesture of making a sign of "X" by using two fingers, so as to execute, for example, a mute function from among functions of the video call service. As described above, an image signal including also a gesture 23 variously taken by the user for the gesture recognition may be transmitted to the counterpart display apparatus 200 and may be intactly displayed on the main screen 21 of the counterpart display apparatus 200. Thus, the other user of the counterpart display apparatus 200 may have to see the unnecessary gesture 23, and thus, may be distracted when viewing the video call screen 20 to lose concentration or even feel uncomfortable. Also, the user himself/herself may not want to show his/her gesture not relevant to the video call content to the other party. Thus, A method, according to which a part for gesture recognition is not included in a video call screen, is provided, in order to remove such non-necessity and reduce user's inconvenience.

Figure 2:
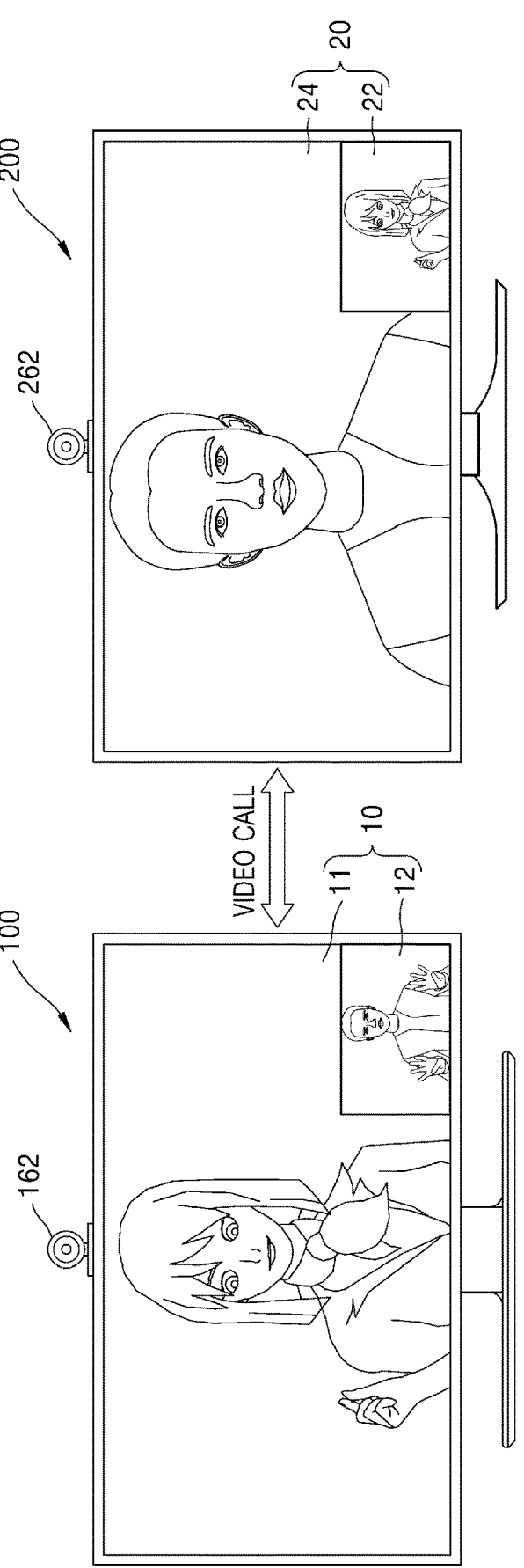
FIG. 2 is a reference diagram for describing a method making it possible to perform a gesture recognition function while not interrupting a video call screen while a video call service is being provided by a display apparatus, according to embodiments of the disclosure.

FIG. 2 is a reference diagram for describing a method making it possible to perform a gesture recognition function while not interrupting a video call screen while a video call service is being provided by a display apparatus, according to embodiments of the disclosure.

Referring to FIG. 2, while the display apparatus 100 and the counterpart display apparatus 200 perform a video call function, a user 15 may use a gesture recognition function for controlling a video call function or other functions. The user 15 may take a specified gesture for triggering the gesture recognition function, and the camera 162 of the display apparatus 100 may capture an image of an upper body of the user 15. The image of the upper body of the user 15 captured by the camera 162 may include not only the face of the user 15, but also a hand making the gesture.

The display apparatus 100 may identify at least a portion of the image obtained by the camera 162 as a transmission area and at least a portion of the image other than the transmission area, as a non-transmission area. The transmission area may indicate a portion of the image transmitted to the counterpart display apparatus 200 for the video call function, and the non-transmission area may indicate a portion of the image not transmitted to the counterpart display apparatus 200. The transmission area, which is the portion transmitted to the counterpart display apparatus 200, may be centered on the face of the user 15 and may not include a body portion by which the user makes a gesture, such as a portion of a hand or an arm. The display apparatus 100 may perform gesture recognition in the non-transmission area. The display apparatus 100 may perform the gesture recognition based on the entire non-transmission area or may determine at least a portion of the non-transmission area as a gesture recognition area and may perform the gesture recognition in the determined gesture recognition area.

As described above, by providing only a portion of the image of the user 15 captured by the camera 162 of the display apparatus 100, the portion not showing the gesture of the user, to the counterpart display apparatus 200, the counterpart display apparatus 200 may output the image of the user 15, the image not including the gesture of the user 15, on a main screen 24. Thus, the other user 25 may not have to watch an unnecessary gesture of the user 15 when using the video call service through the counterpart display apparatus 200, and thus, may use the video call service without being interrupted with respect to a video call.

Figure 3:
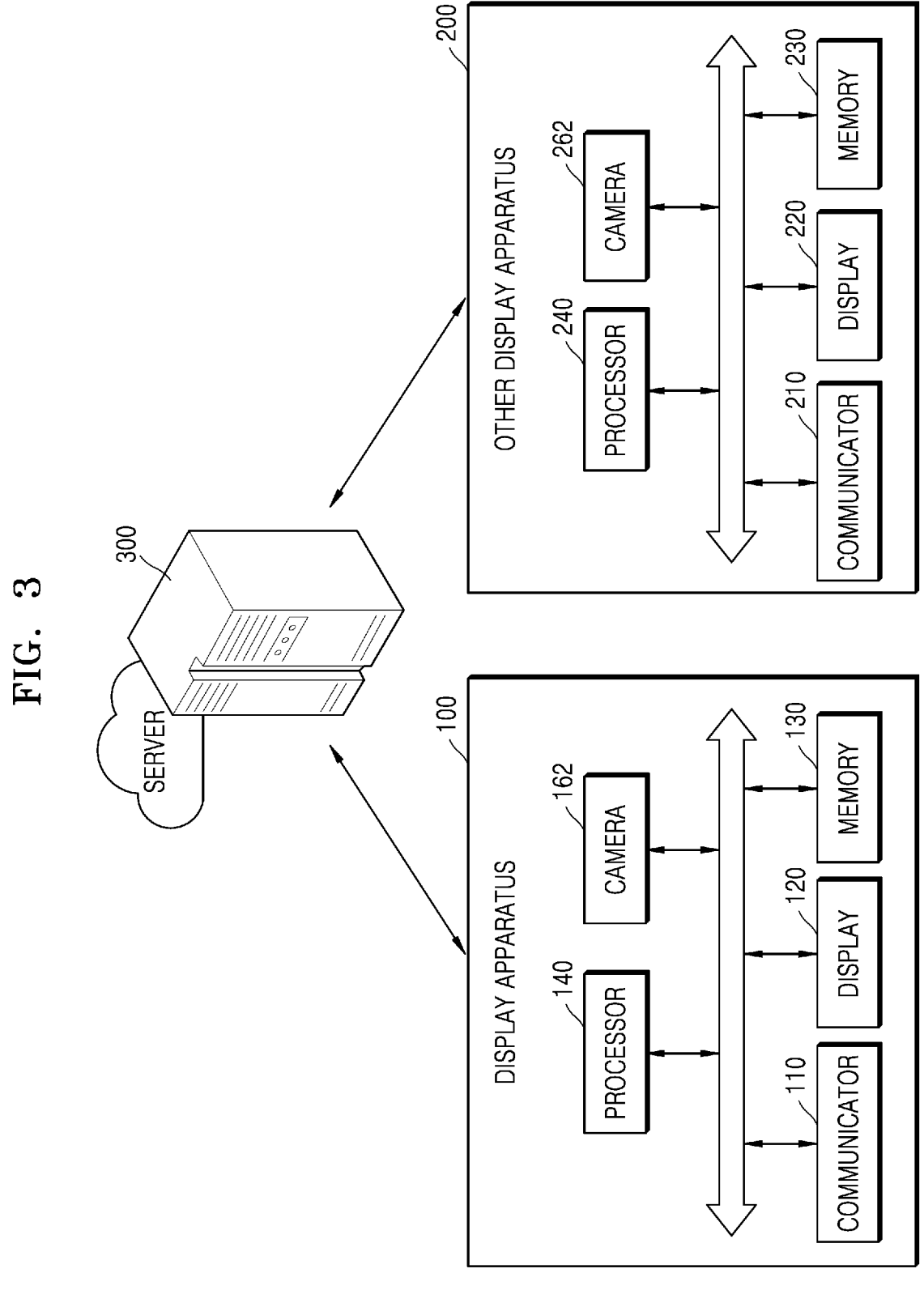
FIG. 3 illustrates an example of a system for performing a video call function, according to an embodiment of the disclosure.

FIG. 3 illustrates an example of a system for performing a video call function, according to an embodiment of the disclosure.

Referring to FIG. 3, the system may include the display apparatus 100, the counterpart display apparatus 200, and a server 300.

The display apparatus 100 may be a device capable of displaying an image or data according to a request of a user and may include a communicator 110, a display 120, a memory 130, a processor 140, and the camera 162.

The communicator 110 (e.g., a communication interface including a communication circuitry) may perform communication with at least one external electronic device, at least one server, and/or at least one broadcasting station. The at least one external electronic device may be the counterpart display apparatus 200 and/or an external storage medium, which may be connected through a connecting terminal.

In detail, the communicator 110 may receive data received from various data sources. For example, the communicator 110 may receive a plurality of pieces of content. In detail, the communicator 110 may receive a plurality of image signals corresponding the plurality of pieces of content, respectively, from, for example, a broadcasting station, an Internet server, and/or a content provider server. For example, each of the plurality of image signals may include a broadcasting stream signal, a transport stream (TS), and/or a video streaming signal. The configuration of the communicator 110 are to be described in detail below with reference to FIG. 4.

The display 120 may output an image on a screen. In detail, the display 120 may output an image corresponding to video data, through a display panel (not shown) included in the display 120, so that a user may visually recognize the video data. The video data may correspond to a decoded image signal.

The display 120 may output a video call screen. Also, the display 120 may output the video call screen in a picture in picture (PIP) form through a main screen and a sub-screen having different sizes from each other. The sub-screen may be overlaid on the main screen.

The display 120 may output an image or data processed by the display apparatus 100.

The camera 162 may capture an image (for example, consecutive frames) corresponding to an external environment or a motion of a user, the motion including a gesture, within a camera recognition range.

The memory 130 may store a program for processing and controlling by the processor 140 and may store data input to the display apparatus 100 or output from the display apparatus 100. Also, the memory 130 may store data required for operations of the display apparatus 100.

The memory 130 may include at least one type of storage medium from among a flash memory type, a hard disk type, a multimedia card micro type, a card type memory (e.g., an SD or an XD memory), random-access memory (RAM), static RAM (SRAM), read-only memory (ROM), electrically erasable programmable ROM (EEPROM), programmable ROM (PROM), a magnetic memory, a magnetic disk, and an optical disk.

The processor 140 may control general operations of the display apparatus 100. For example, the processor 140 may execute one or more instructions stored in the memory 130 to perform functions of the display apparatus 100 described herein. The processor 140 may include one or more processors, and the one or more processors may execute one or more instructions stored in the memory 130 to perform functions of the display apparatus 100 described herein.

The processor 140 may store one or more instructions in an internal memory provided in the processor 140 and may execute the one or more instructions stored in the internal memory provided in the processor 140 to control the operations of the display apparatus to be performed. That is, the processor 140 may execute at least one instruction or program stored in the internal memory of the processor 140 or the memory 130, to perform a specified operation.

The processor 140 may execute the one or more instructions stored in the memory 130 to control the camera 162 to capture an image of the user 15 for a video call service.

The processor 140 may execute the one or more instructions stored in the memory 130 to control the communicator 110 to transmit the image of the user 15 captured by the camera 162 to the counterpart display apparatus 200.

The processor 140 may execute the one or more instructions stored in the memory 130 to control the communicator 110 to receive an image of the other user 25 for the video call service.

The processor 140 may execute the one or more instructions stored in the memory 130 to control the display 120 to output the image of the other user 25 received by the communicator 110 for the video call service on a main screen of a video call screen and output the image of the user 15 obtained through the camera 162 on a sub-screen of the video call screen. However, it is not needed that the image of the user 25 is displayed on the main screen of the video call screen, and the image of the user 15 is displayed on the sub-screen of the video call screen. The image of the user 15 and the image of the other user 25 may be displayed on two split screens having the same size.

The processor 140 may execute the one or more instructions stored in the memory 130 to identify a transmission area and a gesture recognition area from an image area of an image captured by the camera for a video call.

The processor 140 may execute the one or more instructions stored in the memory 130 to control the communicator to transmit an image corresponding to the transmission area to the counterpart display apparatus in order to provide the video call service.

The processor 140 may execute the one or more instructions stored in the memory 130 to perform gesture recognition in an image corresponding to the gesture recognition area and perform a function corresponding to a recognized gesture.

The processor 140 may execute the one or more instructions stored in the memory 130 to determine the gesture recognition area in a specified position of the image area.

The processor 140 may execute the one or more instructions stored in the memory 130 to detect a hand of the user in the image area and determine the gesture recognition area based on an area in which the hand is detected.

The processor 140 may execute the one or more instructions stored in the memory 130 to provide a user interface for adjusting the gesture recognition area and adjust the gesture recognition area according to a user input through the user interface.

The processor 140 may execute the one or more instructions stored in the memory 130 to perform the gesture recognition according to a specified event while the video call service is provided, wherein the specified event may include at least one of a user input of selecting the gesture recognition function or detection of a motion having a value greater than a threshold value in the image area.

The processor 140 may execute the one or more instructions stored in the memory 130 to identify a type of zoom-in, based on a zoom-in function being executed while the gesture recognition function is provided during the provision of the video call service, and based on the zoom-in function being optical zoom-in.

The processor 140 may execute the one or more instructions stored in the memory 130 to, based on the type of zoom-in being identified as an optical zoom-in, output a message informing that the gesture recognition function has been terminated, and based on the type of zoom-in being identified as digital zoom-in, an expand image corresponding to the transmission area and control the communicator to transmit, to the counterpart display apparatus for the video call, expanded image corresponding to the transmission area, perform gesture recognition in an image corresponding to the gesture recognition area, and perform a function corresponding to a recognized gesture.

The processor 140 may execute the one or more instructions stored in the memory 130 to switch the normal camera for capturing the image for the video call to a zoom camera for capturing an expanded image, based on a zoom-in function being executed while the gesture recognition function is provided during the provision of the video call service.

The processor 140 may execute the one or more instructions stored in the memory 130 to provide a gesture guide guiding one or more gestures and a function corresponding to each of the gestures in order to guide the user with available gestures.

The processor 140 may execute the one or more instructions stored in the memory 130 to end the gesture recognition according to a specified event while the video call service is provided. The specified event may include at least one of recognition of a gesture for ending the gesture recognition function or a user input of selecting an end of the gesture recognition function.

FIG. 3 shows a block diagram of the display apparatus 100 according to an embodiment of the disclosure. Each component of the block diagram may be combined, added, or omitted according to the specification of the display apparatus 100 that is actually implemented. For example, two or more components may be integrated into one component, or one component may be divided into two or more components, according to necessity. Also, a function executed in each block is described to explain the disclosed embodiments, and its specific operation or device does not limit the scope of the disclosed embodiments.

The counterpart display apparatus 200 may include a communicator 210, a display 220, a memory 230, the camera 262, and a processor 240. However, the counterpart display apparatus 200 may be realized by including more components than the illustrated components and is not limited to the described example.

The communicator 210 may communicate with an external device by using various communication techniques.

The display 220 may output an image or data processed by the counterpart display apparatus 200.

The camera 262 may capture an image (for example, consecutive frames) corresponding to an external environment or a user's motion including a gesture within a camera recognition range.

The memory 230 may store a program for processing and controlling by the processor 240 and may store data input to the counterpart display apparatus 200 or output from the counterpart display apparatus 200.

The memory 230 may include at least one type of storage medium from among a flash memory type, a hard disk type, a multimedia card micro type, a card type memory (e.g., an SD or an XD memory), RAM, SRAM, ROM, EEPROM, PROM, a magnetic memory, a magnetic disk, and an optical disk.

The processor 240 may control general operations of the counterpart display apparatus 200. For example, the processor 240 may execute one or more instructions stored in the memory 230 to perform functions of the counterpart display apparatus 200 described herein.

Also, The processor 240 may store one or more instructions in an internal memory provided in the processor 240 and may execute the one or more instructions stored in the internal memory provided in the processor 240 to control the operations described above to be performed. That is, the processor 240 may execute at least one instruction or program stored in the internal memory of the processor 240 or the memory 230, to perform a specified operation.

The processor 240 may execute the one or more instructions stored in the memory 230 to control the camera 262 to capture an image of the user 25 for a video call service.

The processor 240 may execute the one or more instructions stored in the memory 230 to control the communicator 210 to transmit the image of the user 25 captured by the camera 262 to the display apparatus 100.

The processor 240 may execute the one or more instructions stored in the memory 230 to control the communicator 210 to receive the image of the user 15 for the video call service.

The processor 240 may execute the one or more instructions stored in the memory 230 to control the display 220 to output the image of the user 15 received for the video call service on a main screen of a video call screen and output the image of the other user 25 received through the communicator 210 on a sub-screen of the video call screen. However, it is not required that the image of the user 15 is displayed on the main screen of the video call screen, and the image of the other user 25 is displayed on the sub-screen of the video call screen. The image of the user 15 and the image of the other user 25 may be displayed on two screens split into the same sizes.

The counterpart display apparatus 200 may include all types of devices configured to perform functions by including a processor and a memory. The counterpart display apparatus 200 may be a stationary or portable device. For example, the counterpart display apparatus 200 may include various electronic devices, for example, a computer, such as a desktop computer, a laptop computer, a tablet computer, a television, a set-top box, a smartphone, a cellular phone, a game player, a music player, a video player, a medical device, and/or a home appliance product.

FIG. 3 shows a block diagram of the counterpart display apparatus 200 according to an embodiment of the disclosure. Each component of the block diagram may be combined, added, or omitted according to the specification of the counterpart display apparatus 200 that is actually implemented. For example, two or more components may be integrated into one component, or one component may be divided into two or more components, according to necessity. Also, a function executed in each block is described to explain the disclosed embodiments, and its specific operation or device does not limit the scope of the disclosed embodiments.

Figure 4:
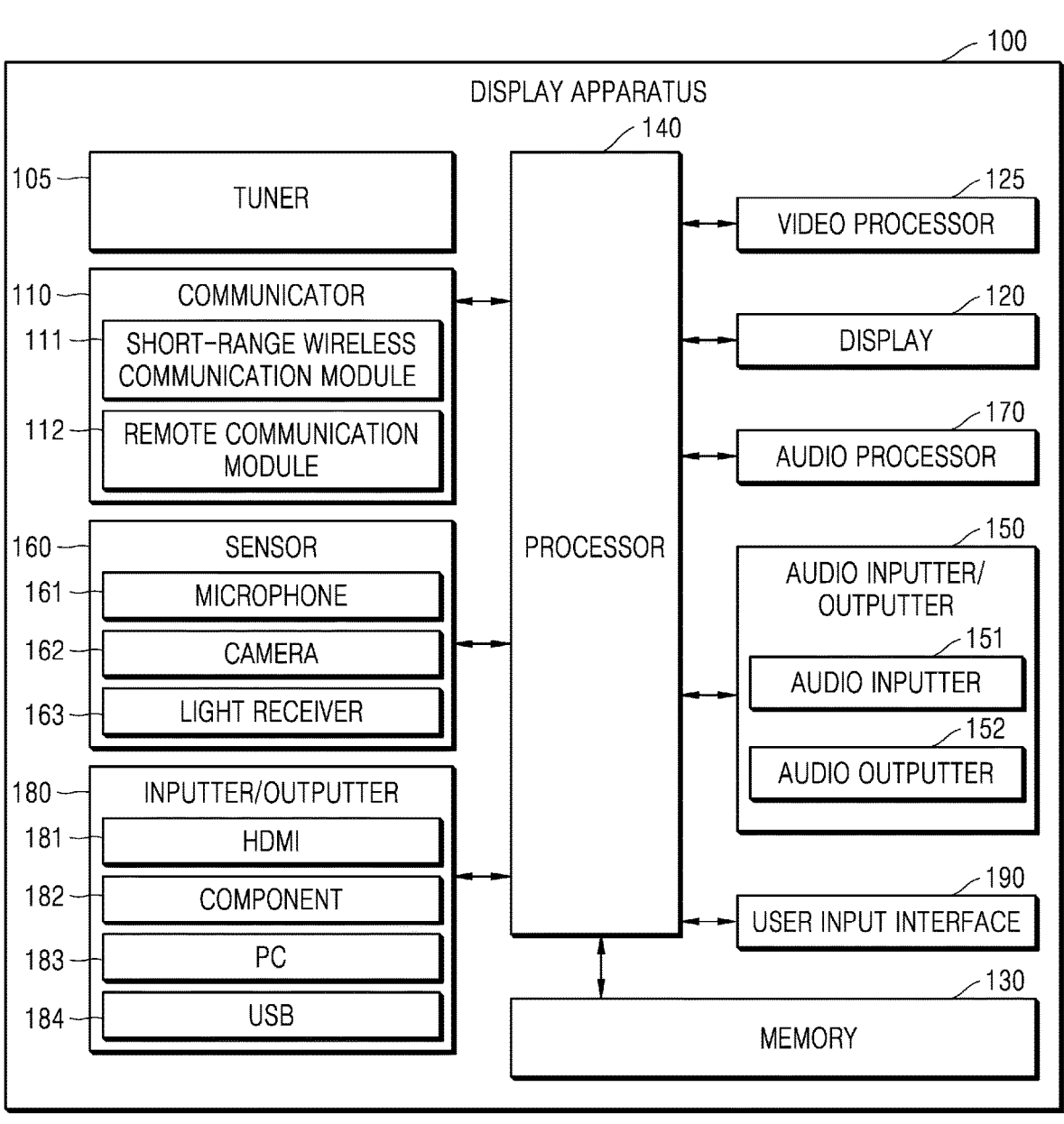
FIG. 4 is a detailed block diagram of a display apparatus according to an embodiment of the disclosure.

FIG. 4 is a detailed block diagram of a display apparatus according to an embodiment of the disclosure. The display apparatus 100 illustrated in FIG. 4 may correspond to the display apparatus 100 illustrated in FIG. 3 Thus, when describing the display apparatus 100, the same descriptions as FIG. 3 are omitted.

Referring to FIG. 4, the display apparatus 100 may include a tuner 105, the communicator 110, the display 120, a video processor 125, the memory 130, the processor 140, an audio inputter/outputter 150, a sensor 160, an audio processor 170, an inputter/outputter 180, and a user input interface 190.

The tuner 105 may tune and select only a frequency of a channel to be received by the display apparatus 100 from among many electro-wave components, through, for example, amplification, mixing, and/or resonance. with respect to, for example, a broadcasting signal received in a wired or wireless manner. The broadcasting signal may include audio data, video data, and additional data (for example, an electronic program guide (EPG)).

The tuner 105 may receive the broadcasting signals from a frequency band corresponding to a channel number (for example, a cable broadcasting channel number 506) according to a control signal received from an external control device (not shown), for example, a remote controller, wherein the control signal includes for example, an input of a channel number, an input of upward or downward scrolls through channels, and/or a channel input on an EPG screen.

The tuner 105 may receive the broadcasting signal from various sources, such as ground wave broadcasting, cable broadcasting, satellite broadcasting, and/or Internet broadcasting. The tuner 105 may receive the broadcasting signal from the source, such as analog broadcasting or digital broadcasting. The broadcasting signal received through the tuner 105 may be decoded (for example, audio-decoded, video-decoded, or additional data-decoded) and divided into audio data, video data and/or additional data. The divided audio, video, and/or additional data may be stored in the memory 130 according to control by the processor 140.

The tuner 105 may be realized as an all-in-one type with the display apparatus 100, as an additional device (for example, a set-top box (not shown)) having a tuner electrically connected to the display apparatus 100, or as a tuner (not shown) connected to the inputter/outputter 180.

The communicator 110 may perform communication with an external electronic device (not shown) through at least one wired or wireless communication network. The communicator 110 may communicate with the counterpart display apparatus 200. Also, the communicator 110 may perform communication with a server (for example, the server 300 illustrated in FIG. 4) for transmitting and receiving specified data to and from the counterpart display apparatus 200. Also, the communicator 110 may perform communication with, for example, a content provision server, and/or an Internet server.

The communicator 110 may communicate with the external device (for example, at least one of the counterpart display apparatus 200 or the server (not shown)) through a communication network. In detail, the communicator 110 may be provided as a form including, for example, at least one communication module, and/or communication circuit, and may transmit and receive data to and from the external device through the communication module and/or the communication circuit.

In detail, the communicator 110 may include at least one short-range wireless communication module 111 performing communication according to the communication standards, such as Bluetooth, Wifi, Bluetooth low energy (BLE), near-field communication (NFC)/radio-frequency identification (RFID), Wifi-direct, ultra-wideband (UWB), or Zigbee.

Also, the communicator 110 may further include a remote communication module 112 performing communication with a server for assisting remote communication according to the remote communication standards. In detail, the communicator 110 may include a remote communication module performing communication through a network for Internet communication. Also, the communicator 110 may include a communication network according to the communication standards, such as 3G, 4G, and/or 5G.

The communicator 110 may perform communication with the external electronic device (not shown) according to control by the processor 140. The processor 140 may transmit/receive content to/from the external device connected to the processor 140 through the communicator 110, download an application from the external device, or browse the Web. In detail, the communicator 110 may access the network and receive content from the external device (not shown).

The display 120 may display a specified screen. In detail, the display 120 may display, on a screen, video included in the broadcasting signal received through the tuner according to control by the processor 140. Also, the display 120 may display content (for example, video) that is input through the communicator 110 or the inputter/outputter 180.

Also, the display 120 may output an image stored in the memory 130 according to control by the processor 140. Also, the display 120 may display a sound user interface (UI) (for example, including a sound command guide) for performing a sound recognition task corresponding to sound recognition or a motion UI (for example, including a user motion guide for motion recognition) for performing a motion recognition task corresponding to motion recognition.

The video processor 125 may perform image processing on video data. In detail, the video processor 125 may process the video data received by the display apparatus 100, for example, an image signal. The video processor 125 may perform various image processing operations on the video data, such as decoding, scaling, noise reduction, frame rate conversion, and/or resolution conversion.

The memory 130 may store at least one instruction. Also, the memory 130 may store at least one instruction executed by the processor 140. Also, the memory 130 may store at least one program executed by the processor 140. Also, the memory 130 may store an application for providing a specified service. For example, the memory 130 may store a video call application.

In detail, the memory 130 may include at least one type of storage medium from among a flash memory type, a hard disk type, a multimedia card micro type, a card type memory (e.g., an SD or an XD memory), RAM, SRAM, ROM, EEPROM, PROM, a magnetic memory, a magnetic disk, and an optical disk.

The audio inputter/outputter 150 may output audio acoustically recognizable by a user or may sense and/or receive audio. In detail, the audio inputter/outputter 150 may include an audio outputter 151 and an audio inputter 152.

The audio outputter 151 may output audio according to control by the processor 140.

In detail, the audio outputter 151 may output audio (for example, a voice or sound) that is input through the communicator 110.

The processor 140 may control the audio outputter 151 to output audio received from the counterpart display apparatus 200, which is the other party of a video call, during a video call mode.

The audio outputter 151 may output audio included in the broadcasting signal received through the tuner according to control by the processor 140. The audio outputter 151 may output audio (for example, a voice or sound) input through the communicator 110 or the inputter/outputter 180. Also, the audio outputter 151 may output audio stored in the memory 130 according to control by the processor 140.

The audio outputter 151 may include at least one of a speaker, a headphone output terminal, or a Sony/Philips digital interface (S/PDIF) output terminal. The audio outputter 151 may include a combination of a speaker, a headphone output terminal, and an S/PDIF output terminal.

The audio inputter 152 may receive audio. In detail, the audio inputter 152 may include a microphone potion (in detail, a microphone) receiving audio, which is an external audio signal, and processing the audio into electrical sound data. For example, the microphone included in the audio inputter 152 may receive the sound signal from an external device or a speaker, for example, a user performing a video call. Also, the microphone included in the audio inputter 152 may use various noise removal algorithms for removing noise occurring in a process of receiving an external sound signal.

During the video call mode, the audio inputter 152 may receive the sound signal including a user's voice and remove noise from the received sound signal to process the user's voice to be recognized, according to control by the processor 140. The audio processor 170 may perform processing on audio data. The audio processor 170 may perform various processing operations on the audio data, such as decoding, amplification, and/or noise reduction. The audio processor 170 may include a plurality of audio processing modules for processing audio data corresponding to a plurality of pieces of content.

The camera 162 may include an image sensor and may obtain, through the image sensor, an image frame, such as a still image or a video, in the video call mode or a capturing mode. The camera 162 may be activated based on the reception of a video call request. Thus, the activated camera 162 may perform a capturing operation to obtain an image with respect to the user requesting the video call.

In detail, the camera 162 may obtain an image frame based on a specified time interval according to a frame per second (FPS) that is set. For example, the camera 162 may obtain 30 pieces of image frames per second. Thus, a first image obtained by the camera 162 may denote a set of images consecutively obtained and renewed or each of the images.

The display apparatus 100 may include one camera.

The display apparatus 100 may include a plurality of cameras arranged in different positions from each other. When the display apparatus 100 includes a plurality of cameras, the display apparatus 100 may select any one of the plurality of cameras for the video call, based on its setting or a user input.

Also, the camera configured to obtain the image with respect to the user may not be included in the display apparatus 100, but may be separately provided from the display apparatus 100. For example, the camera may be an external camera arranged on a side surface of the display apparatus 100 or arranged to be adjacent to the display apparatus 100 in order to capture a front side of the display apparatus 100. In this case, the external camera and the display apparatus 100 may be connected to each other through a wired or wireless signal cable, and the external camera may obtain the image with respect to the user of the video call according to control by the display apparatus 100.

Hereinafter, for convenience of explanation, it is illustrated and described based on an example in which the camera for obtaining the image with respect to the user for the video call is included in the display apparatus 100.

The inputter/outputter 180 may receive input data of various formats. The data received through the inputter/outputter 180 may have, for example, an RGBA format, and/or a YUV format. Also, the inputter/outputter 180 may receive a plurality of pieces of input data (specifically, image sources) having various formats.

The inputter/outputter 180 may receive video (for example, a motion image), audio (for example, a voice, and/or music), and additional data (for example, an EPG) from the outside of the display apparatus 100, according to control by the processor 140. The inputter/outputter 180 may include one of a high-definition multimedia interface (HDMI) port 181, a component jack 182, a PC port 183, and a universal serial bus (USB) port 184. The inputter/outputter 180 may include a combination of the HDMI port 181, the component jack 182, the PC port 183, and the USB port 184.

It may be easily understood by one of ordinary skill in the art that the structure and the operation of the inputter/outputter 180 may be realized in various ways.

The user input interface 190 may receive a user input for controlling the display apparatus 100. For example, the user input interface 190 may receive a video call request from a user.

The user input interface 190 may include, but is not limited to, a user input device including, for example, a touch panel configured to sense a user's touch, a button configured to receive user's push manipulation, a wheel configured to receive user's rotation manipulation, a keyboard, and/or a dome switch.

Also, the user input interface 190 may be a voice recognition device for voice recognition and may include, for example, a microphone, and the voice recognition device may receive a voice command or a voice request of a user. Accordingly, the processor 140 may control an operation corresponding to the voice command or the voice request to be performed.

Also, the user input interface 190 may include a motion sensing sensor (not shown). For example, the motion sensing sensor may sense a motion of the display apparatus 100 and receive the sensed motion as a user input. Also, the voice recognition device (for example, a microphone) and the motion sensing sensor described above may not be included in the user input interface 190. Rather, the voice recognition device and the motion sensing sensor may be included in the display apparatus 100 as modules that are separate from the user input interface 190.

Also, the user input interface 190 may receive a user input through, for example, a remote controller. In this case, the user input interface 190 may include a communication module for receiving a signal corresponding to a user input from the remote controller. For example, when the remote controller transmits an infrared (IR) signal corresponding to the user input, the user input interface 190 may include an optical reception module capable of receiving the IR signal.

The sensor 160 may sense a voice, an image, or interaction of a user.

The microphone 161 may receive a voice utterance of the user. The microphone 161 may convert the received voice into an electrical signal and may output the electrical signal through the processor 140. The user's voice may include, for example, a voice corresponding to a menu or a function of the display apparatus 100. For example, a recommended recognition range of the microphone 161 may be within about 4 m from the microphone 161 to a location of the user, and the recognition range of the microphone 161 may be changed based on a volume of the voice of the user or an ambient environment (for example, a speaker sound, and/or an ambient noise).

The microphone 161 may be realized as an integral type or a separate type with respect to the display apparatus 100. The microphone 161 that is a separate type may be electrically connected to the display apparatus 100 through the communicator 110 or the inputter/outputter 180.

It may be easily understood by one of ordinary skill in the art that the microphone 161 may be excluded according to the performance and the structure of the display apparatus 100.

The camera 162 may receive an image (for example, consecutive frames) corresponding to a motion of the user including a gesture within a camera recognition range. For example, the recognition range of the camera 162 may correspond to 0.1 m to about 5 m from the camera 162 to the user. The motion of the user may include, for example, a body part of the user, such as a face, an expression, a hand, a fist, and/or a finger of the user, or a motion of the body part of the user. The camera 162 may convert the received image into an electrical signal and output the electrical signal to the processor 140 according to control by the processor 140.

The camera 162 may include a lens and an image sensor. The camera 162 may support optical zoom or digital zoom by using a plurality of lenses and image processing. The recognition range of the camera 162 may be variously set according to an angle of the camera and conditions of an ambient environment. When the camera 162 includes a plurality of cameras, a three-dimensional still image or a three-dimensional motion may be received by using the plurality of cameras. The camera 162 may include two or more cameras including a normal camera and a zoom camera.

The camera 162 may be realized as an integral type or a separate type with respect to the display apparatus 100. An additional device (not shown) including the separate type camera 162 may be electrically connected to the display apparatus 100 through the communicator 110 or the inputter/outputter 180.

It may be easily understood by one of ordinary skill in the art that the camera 162 may be excluded according to the performance and the structure of the display apparatus 100.

A light receiver 163 may receive an optical signal (including a control signal) from an external controller through an optical window (not shown) of a bezel of the display 120. The light receiver 163 may receive, from the controller, the optical signal corresponding to a user input (for example, a touch input, a press input, a touch gesture, a voice, or a motion). A control signal may be extracted from the received optical signal according to control by the processor 140.

The processor 140 may control general operations of the display apparatus 100, control signal flows among the built-in components (not shown) of the display apparatus 100, and process data. When there is a user input or a condition specified and stored is met, the processor 140 may execute an operation system (OS) or various applications stored in the memory 130.

The processor may include a graphics processing unit (GPU) (not shown) for processing graphics data corresponding to video data. The GPU may generate a screen including various objects, such as an icon, an image, and/or text by using a calculator (not shown) and a renderer (not shown). The calculator may use user interaction that is sensed through the sensor in order to calculate attribute values of each of the objects, such as a coordinate value, a shape, a size, and/or a color, via which the object is to be displayed according to a layout of a screen. The renderer may generate the screen of various layouts including the objects based on the attribute values calculated by the calculator. The screen generated by the renderer may be displayed in a display area of the display 120.

The server 300 may communicate with the display apparatus 100 and the counterpart display apparatus 200 through a wireless communication network.

For example, the server 300 may provide a video call or a video call service or support communication required for the video call service. For example, the display apparatus 100 and the counterpart display apparatus 200 may be connected to each other through mobile communication networks, such as 3G, 4G, and/or 5G, and a video call may be performed between the display apparatus 100 and the counterpart display apparatus 200. In this case, the server 300 may be a communication server supporting the mobile communication according to the communication standards, such as 3G, 4G, and/or 5G.

Also, the display apparatus 100 and the counterpart display apparatus 200 may be connected to each other through an Internet communication network. Also, the display apparatus 100 and the counterpart display apparatus 200 may perform a video call through an application providing a video call service in the display apparatuses. Then, the display apparatus 100 and the counterpart display apparatus 200 may perform the video call with each other through the application. In this case, the server 300 may support the application providing the video call service. Specifically, the server 300 may be a server of a user manufacturing and/or distributing the application.

As described above, through the communication relaying of the server 300, the operations required for performing the video call described above may be performed. Although the communication relaying operation of the server 300 is not illustrated in FIG. 3, the communication relaying operation of the server 300 described above may be included in transmitting and receiving of data or a signal between two different apparatuses. Specifically, the server 300 may take charge of transmitting data or a signal in order to support the execution of the video call service.

For example, the server 300 may perform the relaying operation of transmitting a user image signal generated from the display apparatus 100 to the counterpart display apparatus 200. Also, the server 300 may transmit or deliver various data and signals used for performing the video call service to the display apparatus 100 and the counterpart display apparatus 200.

Hereinafter, the description that specified data or signals are transmitted from one device (for example, the display apparatus 100) to another device (for example, the counterpart display apparatus 200) may not only denote that the specified data or signals are directly transmitted from the one device (for example, the display apparatus 100) to the other device (for example, the counterpart display apparatus 200), but may also denote that the specified data or signals are transmitted from the one device (for example, the display apparatus 100) to the other device (for example, the counterpart display apparatus 200) through the communication relaying of the server 300.

Hereinafter, operations performed by the display apparatus 100 are described in detail with reference to FIGS. 5 to 15.

Figure 5:
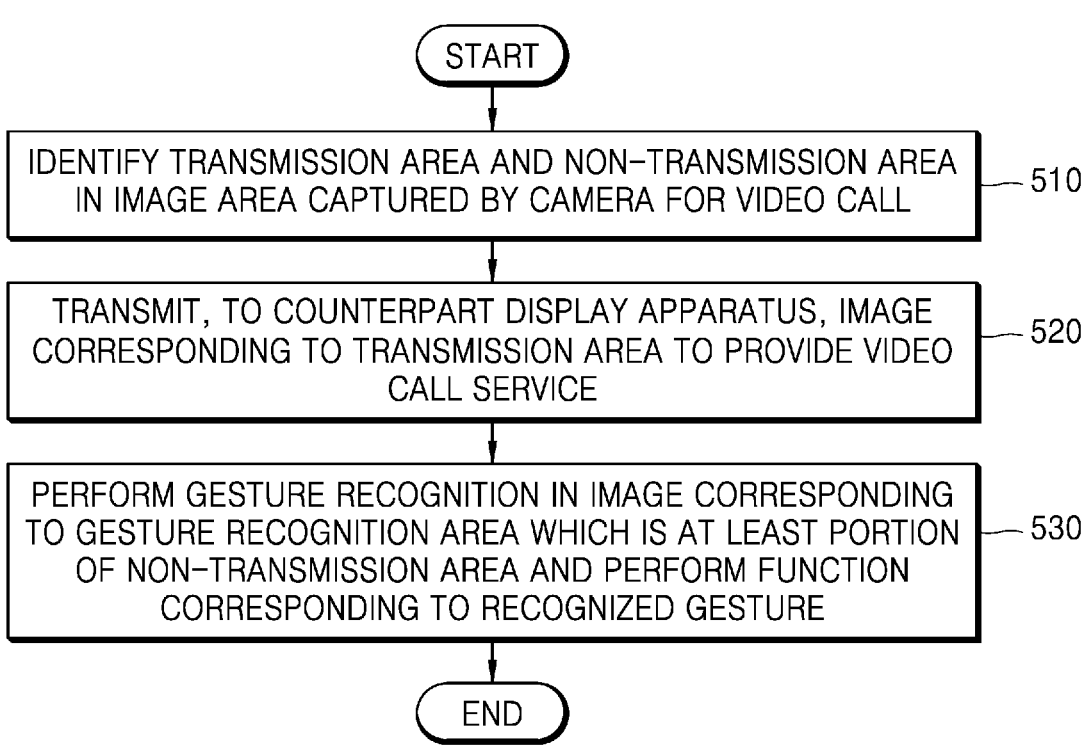
FIG. 5 is a flowchart of an operating method of a display apparatus, according to an embodiment of the disclosure.

FIG. 5 is a flowchart of an operating method of a display apparatus, according to an embodiment of the disclosure. Also, the operating method of the display apparatus illustrated in FIG. 5 indicates sequential operations performed by the display apparatus 100.

In operation 510, the display apparatus 100 may identify a transmission area and a non-transmission area in an image area of an image captured by the camera for a video call.

The display apparatus 100 may perform a video call function with the counterpart display apparatus 200. In detail, the video call function may be performed when any one of the display apparatus 100 and the counterpart display apparatus 200 requests a video call, and the video call request is accepted. The video call request may be based on a user input received through a user interface. For example, a user of the display apparatus 100 may want to make a video call with a friend. Then, the user may input a user input of requesting a video call through a user interface of the display apparatus 100. Then, the processor 140 may recognize based on the user input that the video call request is received. Alternatively, the video call request may be received by a display apparatus of the other party who wants to make a video call with the user of the display apparatus 100. That is, the video call request may be received based on a request of at least one of the user of the display apparatus 100 or the other user of the counterpart display apparatus 200.

According to the execution of the video call function, the display apparatus 100 may capture an image of the user of the display apparatus 100 and transmit the image of the user to the counterpart display apparatus 200, and the display apparatus 100 may receive, from the counterpart display apparatus 200 of the other party, which is the partner of the video call, an image of the other party.

While the display apparatus 100 performs the video call function, the display apparatus 100 may display, on a display, the image of the other party received from the counterpart display apparatus 200, and the image of the user. For example, the display apparatus 100 may display the image of the other party on a main screen and the image of the user on a sub-screen. Alternatively, the display apparatus 100 may display the image of the other party and the image of the user on the screens of the same size.

The display apparatus 100 may capture the image of the user by using a camera for a video call screen. The display apparatus 100 may identify a transmission area and a non-transmission area in an image area of an image captured by the camera for the video call. The transmission area refers to an area identified for transmission to the counterpart display apparatus 200 and may mainly include an upper body portion including a face of the user. The non-transmission area may be an area in the image area of the image captured by the camera for the video call, other than the transmission area for transmission to the counterpart display apparatus.

The display apparatus 100 may identify the transmission area and the non-transmission area in specified positions of the image area of the image captured by the camera for the video call. For example, the image area of the image captured by the camera for the video call may include an upper body portion including the face of the user. The display apparatus 100 may empirically predetermine a position of a portion of the image area, the portion including the face of the user, and may identify the transmission area in the specified position and identify an area of the image area, other than the transmission area, as the non-transmission area.

The display apparatus 100 may detect the face in the image area of the image captured by the camera for the video call and may identify the transmission area and the non-transmission area based on an area in which the face is detected. For example, the display apparatus 100 may detect the face of the user in the image area, by using various object detection techniques, and may identify the area in which the face is detected or an area including also some regions around the area in which the face is detected as the transmission area and identify an area of the image area other than the transmission area, as the non-transmission area. Various object detection techniques may include, for example, a rule-based object detection technique or an artificial intelligence (AI)-based object detection technique.

The display apparatus 100 may detect a hand in the image area of the image captured by the camera for the video call and may identify the transmission area and the non-transmission area based on an area in which the hand is detected. For example, the display apparatus 100 may detect the hand of the user in the image area, by using various object detection techniques, and may identify the area in which the hand is detected or an area including also some regions around the area in which the hand is detected as the transmission area and identify an area of the image area other than the transmission area, as the non-transmission area. Various object detection techniques may include, for example, a rule-based object detection technique or an AI-based object detection technique.

In operation 520, the display apparatus 100 may transmit an image corresponding to the transmission area to the counterpart display apparatus 200 in order to provide the video call service.

In detail, the display apparatus 100 may control the communicator to transmit the image corresponding to the transmission area to the counterpart display apparatus 200. As described above, the transmission area may be identified based on an area based on the face, in the image captured to provide the video call service, or the transmission area may be identified to exclude a hand which may make a gesture, and the image corresponding to the transmission area may be transmitted to the counterpartdisplay apparatus 200. Thus, it may be prevented to show the hand gesture of the user on a video call screen on a display of the counterpartdisplay apparatus 200.

In operation 530, the display apparatus 100 may perform gesture recognition in an image corresponding to a gesture recognition area which is at least a portion of the non-transmission area and may perform a function corresponding to a recognized gesture.

The display apparatus 100 may determine at least a portion of the non-transmission area as the gesture recognition area. The display apparatus 100 may determine the entire non-transmission area as the gesture recognition area.

The display apparatus 100 may determine the gesture recognition area in a specified position of the non-transmission area.

The display apparatus 100 may detect a hand of the user in the non-transmission area by using various object detection techniques and may determine an area in which the hand is detected or an area including also some regions around the area in which the hand is detected as the gesture recognition area. Various object detection techniques may include, for example, a rule-based or AI-based object detection technique.

The display apparatus 100 may perform a gesture recognition operation in the determined gesture recognition area. The gesture recognition may refer to an operation, performed by the display apparatus 100, of recognizing and identifying a specified motion performed by the user by analyzing the obtained image. The display apparatus 100 may perform the gesture recognition operation by preprocessing an image corresponding to the gesture recognition area to find an attribute, measuring a degree of similarity by comparing a motion recognized based on the attribute with each of gestures stored in a gesture database, and identifying a gesture, the similarity value of which with respect to the compared gesture of the database is measured to be greater than a threshold value.

The display apparatus 100 may perform a function corresponding to the gesture determined by the gesture recognition operation.

The display apparatus 100 may perform a specified function corresponding to the gesture determined by the gesture recognition operation. The specified function may include one or more functions for controlling the video call function or one or more functions for generally controlling the display apparatus. For example, a hand gesture may include gestures corresponding to the number of unfolded fingers. For example, the hand gesture may include a gesture of unfolding one finger, a gesture of unfolding two fingers, a gesture of unfolding three fingers, a gesture of unfolding four fingers, and a gesture of unfolding five fingers. The hand gesture may include a gesture of making an OK sign by connecting a thumb with an end of an index finger. Alternatively, the hand gesture may include a gesture of making an X shape by using two fingers. The hand gesture may include a gesture of directly using a motion of a hand. The hand gesture may include a gesture of clenching one's fist, a gesture of vertically moving a hand, and a gesture of horizontally moving a hand.

A function mapped to each gesture may be variously determined. For example, the function mapped to each gesture may include a function of controlling a video call or a function of generally controlling the display apparatus. The function of controlling the video call function may include various functions, such as ending of the video call, putting on mute, switching of the video call to a sound call, expanding of a video call screen, and/or reducing of the video call screen. The function of generally controlling the display apparatus may include, for example, raising a volume.

As described above, when the gesture recognition function is used while the video call is performed, the image transmitted to the counterpartdisplay apparatus 200 and displayed on the counterpart display apparatus 200 may not show the user's gesture, and thus, the user making the gesture or the other user may not be interrupted by the user's gesture motion and may be concentrated on the video call.

Figure 6:
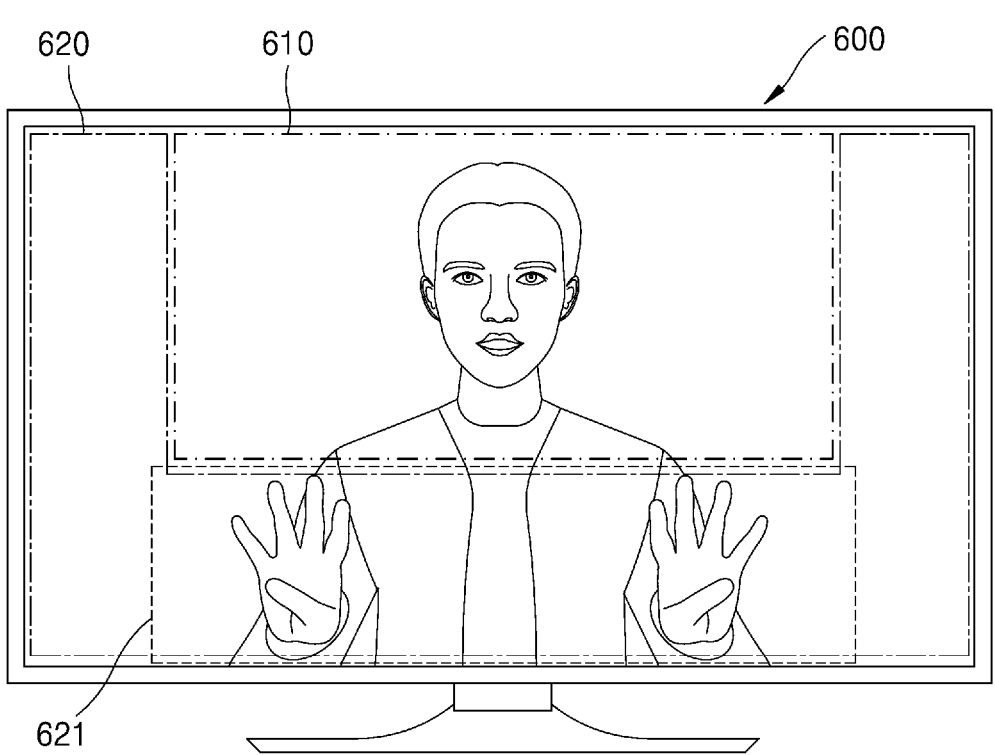
FIG. 6 is a reference diagram for describing a method of recognizing a transmission area in a user's image captured for a video call function, according to an embodiment of the disclosure.

FIG. 6 is a reference diagram for describing a method of recognizing a transmission area in an image of a user captured for a video call.

Referring to FIG. 6, the display apparatus 100 may identify a transmission area 610 and a non-transmission area 620 in an image 600 of a user captured for a video call. The transmission area 610 refers to an area that is to be transmitted to the counterpart display apparatus 200 for a video call screen, and the non-transmission area 620 refers to an area including an area on which user's gesture recognition is to be performed.

The display apparatus 100 may identify, according to various methods, the transmission area 610 and the non-transmission area 620 in the image 600 of the user captured for the video call. A user performing the video call may be, for example, seated on a chair in front of the display apparatus 100 so that a camera of the display apparatus 100 may photograph the user, and thus, in many cases, the camera may capture an upper body image above the waist of the user. Thus, in general, the image 600 of the user captured for the video call may include an upper body of the user. Based on this empirical data, the display apparatus 100 may identify some upper percentage points, for example, upper 60 percentage points, of the image 600 of the user as the transmission area 610 and may identify the rest portions as the non-transmission area 620. Alternatively, the display apparatus 100 may identify some lower percentage points, for example, lower 30 percentage points, of the image 600 of the user as the non-transmission area 620.

The display apparatus 100 may determine a gesture recognition area 621 in the non-transmission area 620 identified in the image 600 of the user captured for the video call.

For example, the display apparatus 100 may determine the entire non-transmission area 620 as the gesture recognition area 621.

For example, the display apparatus 100 may determine some portions of the non-transmission area 620 as the gesture recognition area 621. For example, the display apparatus 100 may determine a portion of the non-transmission area 620, the portion being expected to be where a user's hand is located, as the gesture recognition area 621.

The display apparatus 100 may directly perform an operation of detecting a hand of the user in the image 600 of the user captured for the video call and may determine a portion in which the hand of the user is detected as the gesture recognition area 621.

Figure 7:
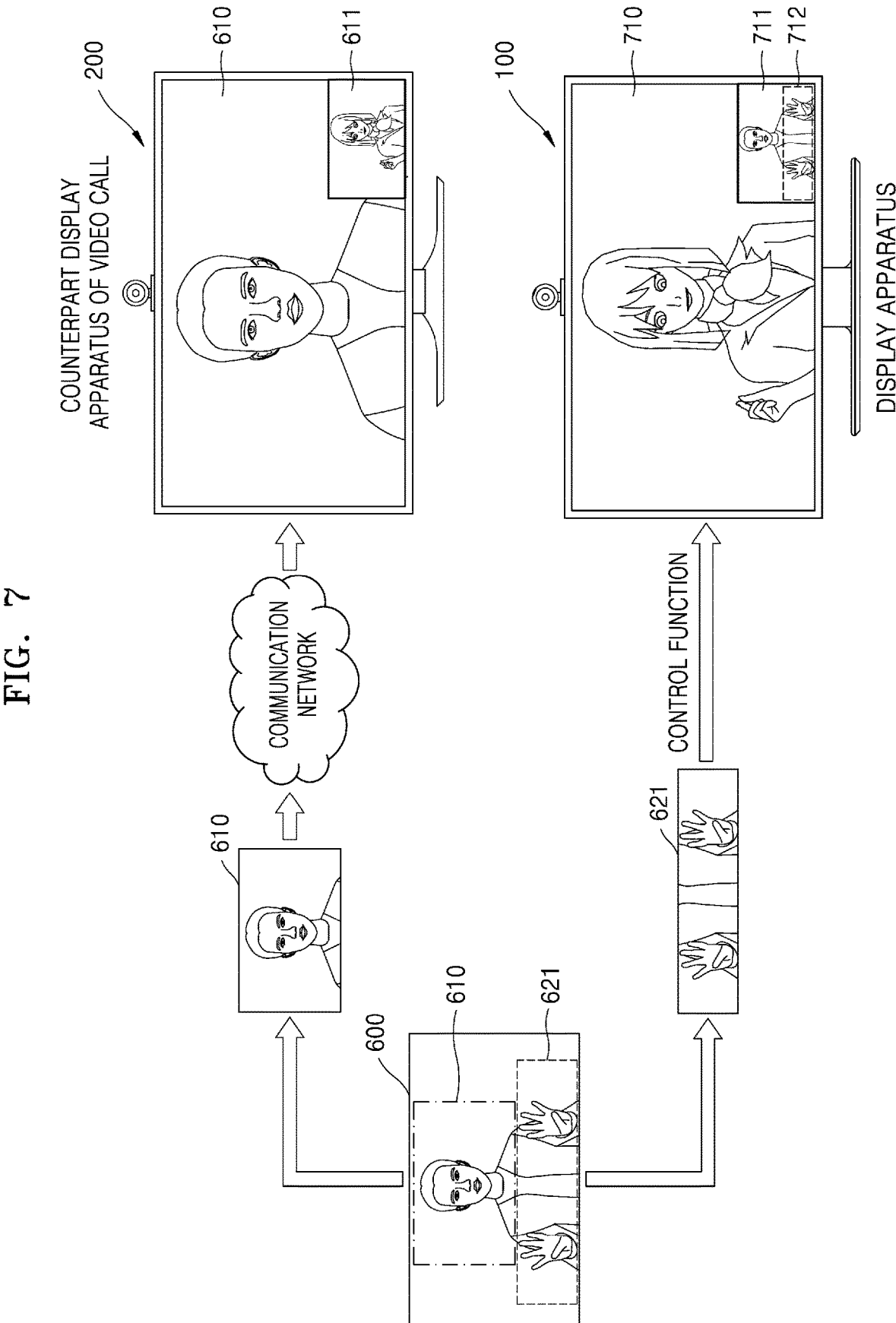
FIG. 7 is a reference diagram for describing an operating method, performed by a display apparatus, of using a transmission area and a gesture recognition area that are identified in a user's image captured for a video call function.

FIG. 7 is a reference diagram for describing an operating method, performed by a display apparatus, of using a transmission area and a gesture recognition area identified in an image of a user captured for a video call function.

Referring to FIG. 7, the display apparatus 100 may transmit, to the counterpart display apparatus 200, an image corresponding to the transmission area 610 identified in the image 600 of the user captured by using the camera, via the communicator. Then, the counterpart display apparatus 200 may display, on a display, the image corresponding to the transmission area 610 received from the display apparatus 100. The counterpart display apparatus 200 may output, on a portion of the display, an image 611 of the other user, who is a user of the counterpart display apparatus 200.

The display apparatus 100 may perform a gesture recognition operation by using an image corresponding to the gesture recognition area 621 identified in the image 600 of the user, and the display apparatus 100 may be controlled according to a function corresponding to a gesture recognized by the gesture recognition operation. The display apparatus 100 may output, on a display, an image 710 of the other user, received from the counterpart display apparatus 200. Also, the display apparatus 100 may output an image 711 of the user of the display apparatus 100 on a portion of the display. Also, to show the user of the display apparatus 100 that the hand of the user is within a gesture recognition area 712 or to guide the user such that the hand of the user for gesture recognition does not deviate from the gesture recognition are 712, the display apparatus 100 may provide a visual effect, such as a boundary line, in the gesture recognition area 712.

Figure 8:
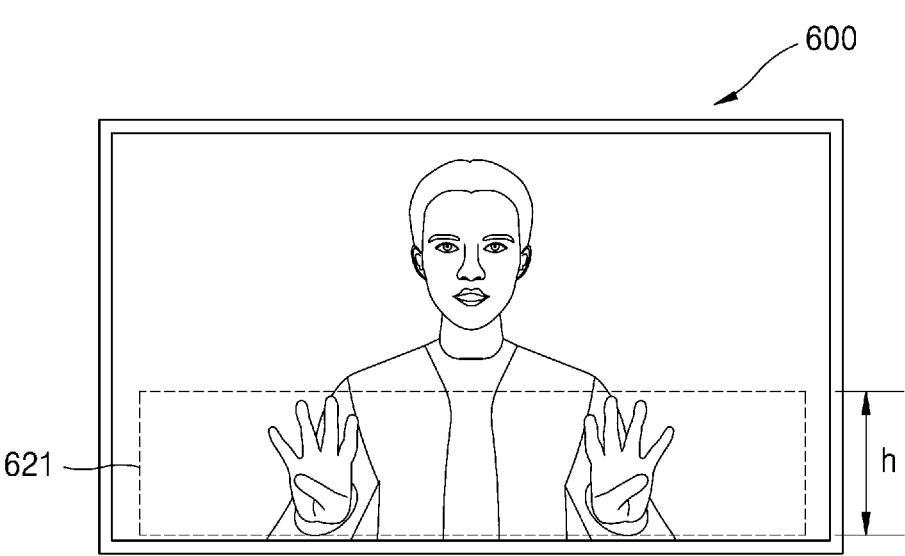
FIG. 8 is a reference diagram for describing an example of a method of determining a gesture recognition area, according to an embodiment of the disclosure.

FIG. 8 is a reference diagram for describing an example of a method of determining a gesture recognition area, according to an embodiment of the disclosure.

Referring to FIG. 8, the display apparatus 100 may identify the gesture recognition area 621 in a specified position of the image 600 of the user captured by using the camera for the video call.

For example, the display apparatus 100 may identify an area in the image 600 of the user, the area being of a specified distance h from a lower end of the image 600 of the user, as the gesture recognition area 621.

For example, the display apparatus 100 may identify some lower percentage points, for example, lower 40 percentage points, of the image 600 of the user, as the gesture recognition area 621.

Figure 9:
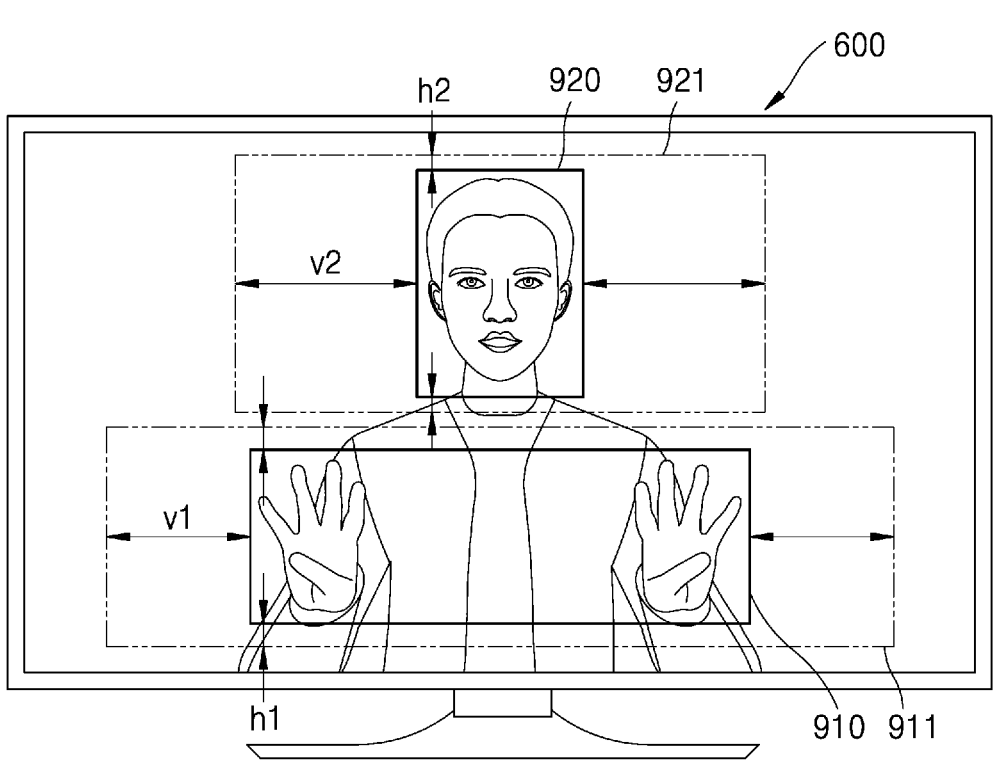
FIG. 9 is a reference diagram for describing an example of a method of determining a gesture recognition area according to detection of a hand, according to an embodiment of the disclosure.

FIG. 9 is a reference diagram for describing an example of a method of determining a gesture recognition area according to hand detection, according to an embodiment of the disclosure.

Referring to FIG. 9, the display apparatus 100 may identify the gesture recognition area 621 by detecting a hand in the image 600 of the user captured by using the camera for the video call.

In general, the user may make a gesture by using a portion of a hand or an arm, and thus, the display apparatus 100 may identify the gesture recognition area 621 by detecting at least one of the hand or the arm of the user in the image 600 of the user.

The display apparatus 100 may obtain a hand detection area 910 by detecting the hand of the user in the image 600 of the user by using an object detection technique. When the user makes a gesture by using a hand, the hand may be substantially moved by a specified distance from the a detected position in upper and low directions or right and left directions, and thus, by considering the distance by which the hand may be, for example, moved, the hand detection area 910 may be expanded horizontally or vertically to determine the gesture recognition area. For example, the display apparatus 100 may determine a gesture recognition area 911 by expanding the hand detection area 910 horizontally by a distance v1 and vertically by a height h1.

The display apparatus 100 may identify a transmission area by detecting a face in the image 600 of the user captured by using the camera for the video call.

The display apparatus 100 may obtain a face detection area 920 by detecting the face of the user in the image 600 of the user by using an object detection technique. For example, the display apparatus 100 may determine a gesture recognition area 921 by expanding the face detection area 920 horizontally by a distance v2 and vertically by a height h2.

Figure 10:
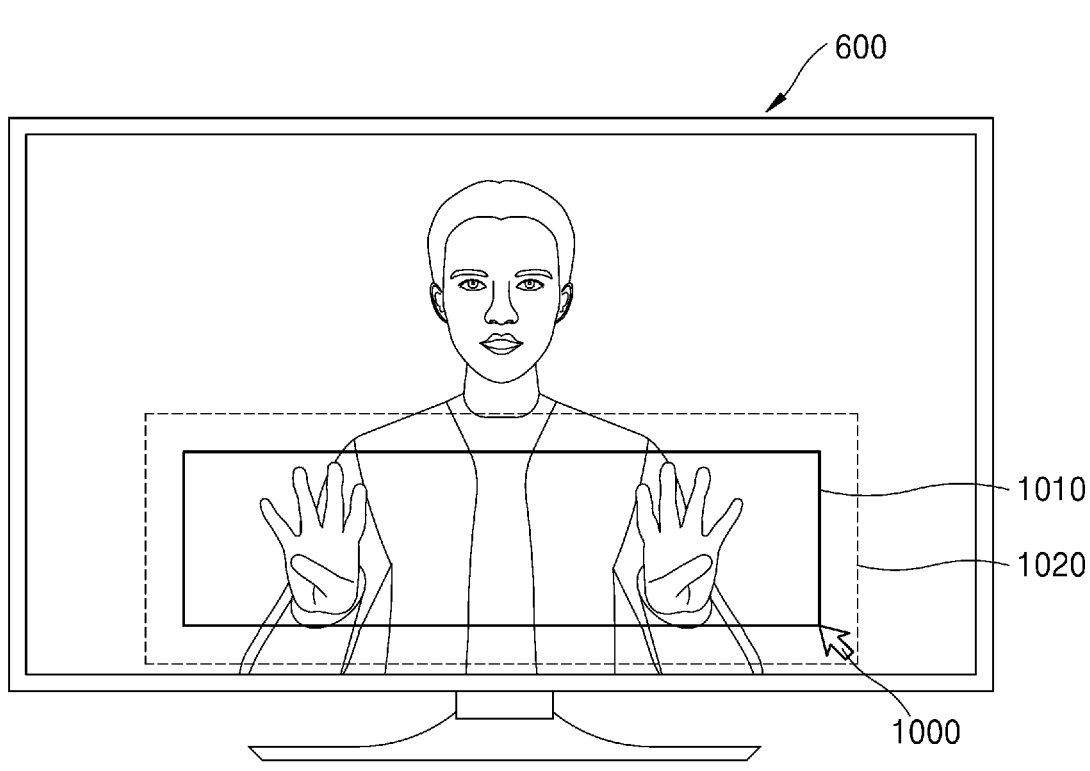
FIG. 10 is a reference diagram for describing a method of adjusting a gesture recognition area, according to an embodiment of the disclosure.

FIG. 10 is a reference diagram for describing a method of adjusting a gesture recognition area, according to an embodiment of the disclosure.

Referring to FIG. 10, the display apparatus 100 may determine a gesture recognition area 1010 in the image 600 of the user captured for the video call. Also, the display apparatus 100 may provide a user input interface for receiving a user input for adjusting the gesture recognition area 1010 determined as described above. The gesture recognition area initially determined may be regarded by the user to be too wide or narrow to take a gesture, and thus, the user interface may be provided to adjust the gesture recognition area 1010. For example, the display apparatus 100 may provide the gesture recognition area 1010 to be adjustable by expanding or reducing the gesture recognition area 1010 by using a cursor 1000, and when the user inputs a user input of adjusting the gesture recognition area 1010 by using the cursor 1000, the display apparatus 100 may adjust the gesture recognition area 1010 to be expanded or reduced according to the user input.

FIG. 11 is an example of a flowchart of a method, performed by a display apparatus, of performing an operation corresponding to a zoom-in input, while the display apparatus provides a video call service and a gesture recognition function, according to an embodiment of the disclosure.

Referring to FIG. 11, operations 1110 to 1130 are the same as operations 510 to 530 of FIG. 5, and thus, their descriptions are omitted.

In operation 1140, the display apparatus 100 may receive a user input of requesting execution of a zoom-in function.

Zoom-in refers to showing an image by expanding the image and may include optical zoom-in and digital zoom-in.

The display apparatus 100 may execute the zoom-in function according to the user input of requesting the zoom-in function. The user may input a zoom-in command by using various user interfaces for requesting the zoom-in function or may input a zoom-in command by making a gesture corresponding to the zoom-in function by using the gesture recognition function.

In operation 1150, the display apparatus 100 may identify a zoom type in order to execute the zoom-in function.

Zoom-in may include optical zoom-in of optical processing and digital zoom-in of software processing.

Zoom-in using the optical zoom-in refers to a capturing method, according to which a zoom lens for continually changing a focal distance by moving a portion of an optical system in an optical axis direction is used, and by adjusting the focal distance of the zoom lens, an object may be photographed to be seen as if the zoom-lens approaches the object. According to this method, by adjusting the focal distance of the lens, an object may be expanded in frames.

The digital zoom-in refers to a capturing method, according to which the zoom effect may be obtained by displaying captured image data by expanding a portion of a screen showing the captured image data based on a digital processing method. According to this method, the zoom effect may be conveniently obtained in a software manner without changing hardware of a lens, but because only limited data of the total screen is displayed to be expanded, the image quality may be deteriorated.

The display apparatus 100 may determine which zoom type the display apparatus 100 is to execute, and according to the determination, when the determined zoom type is optical zoom-in, the display apparatus 100 may proceed to operation 1160, and when the determined zoom type is digital zoom-in, the display apparatus 100 may proceed to operation 1170.

In operation 1160, when the zoom type is the optical zoom-in, the display apparatus 100 may obtain an expanded image of the user by controlling the zoom lens to adjust the focal distance and may transmit the obtained image to the counterpart display apparatus 200.

In operation 1170, the display apparatus 100 may output a message informing that the gesture recognition function has been terminated. Referring to FIG. 12, operations 1160 and 1170 are described.

FIG. 12 is a reference diagram for describing an operating method of a data processing device, when a zoom type is optical zoom-in, according to an embodiment of the disclosure.

As illustrated in FIG. 12, when the video call is started, the display apparatus 100 and the counterpart display apparatus 200 performing the video call may display video call screens. For example, the display apparatus 100 of the user may display a video call screen 1220 by including an image with respect to the other party on a main screen 1221 and an image with respect to the user on a sub-screen 1222. Similarly, a display of the counterpart display apparatus 200 may display a video call screen 1210 by including an image of the user on a main screen 1211 and an image of the other party on a sub-screen 1212.

Referring to FIG. 12, the display apparatus 100 may capture an image 1200 of the user by using a camera while the display apparatus 100 executes a video call function. While the capturing is performed, the display apparatus 100 may identify a zoom type according to a user input of requesting zoom-in, and when the zoom type is optical zoom-in, the display apparatus 100 may adjust a focal distance of a zoom lens so that the user, which is an object, may be expanded in frames. Thus, the display apparatus 100 may obtain an image 1211 of the user, in which the user's appearance is expanded. When the zoom-in function is executed as described above, the user's appearance is expanded in limited frames, and thus, the image 1211 may not include a hand of the user. Thus, the display apparatus 100 may not detect a gesture recognition area in the expanded image 1211.

It may be difficult for the display apparatus 100 to separately identify the gesture recognition area in the expanded image 1211 and thus, the display apparatus 100 may not identify a transmission area or a non-transmission area in the expanded image 1211 and may directly transmit the expanded image 1211 to the counterpart display apparatus 200 of a video call. The counterpart display apparatus 200 may output, on a display, the expanded image 1211, the expanded image 1211 being received from the display apparatus 100.

As illustrated in FIG. 13, when the video call is started, the display apparatus 100 and the counterpart display apparatus 200 performing the video call may display video call screens. For example, the display apparatus 100 of the user may display a video call screen 1320 by including an image with respect to the other party on a main screen 1321 and an image with respect to the user on a sub-screen 1322. Similarly, a display of the counterpart display apparatus 200 may display a video call screen 1310 by including an image of the user on a main screen 1311 and an image of the other party on a sub-screen 1312.

For example, even when zoom-in is performed based on optical zoom-in, a hand of the user may be included in an expanded image, according to the degree of zoom-in. Thus, when a value of zoom-in exceeds a specified threshold value, that is, a threshold value, at or under which a hand of the user may be included in an expanded image, that is, when the hand of the user may not be seen in the expanded image according to zoom-in, the display apparatus 100 may perform operations 1160 and 1170 of FIG. 11. On the contrary, when the value of zoom-in does not exceed the specified threshold value, that is, the threshold value, at or under which the hand of the user may be included in the expanded image, that is, when the hand of the user may be seen in the expanded image according to zoom-in, the display apparatus 100 may perform the gesture recognition function as described in operations 1110 to 1130.

Referring to FIG. 11 again, in operation 1150, when the display apparatus 100 determines the zoom type as digital zoom-in, the display apparatus 100 may proceed to operation 1170.

In operation 1170, the display apparatus 100 may expand an image captured by the camera for the video call and transmit the expanded image to the counterpart display apparatus 200. In the case of the digital zoom-in, the image of the user may not be optically expanded by using a lens, but the captured image may be processed to be expanded based on a software method. The display apparatus 100 may expand the entire captured image based on a software method and may transmit the expanded image to the counterpart display apparatus 200. The display apparatus 100 may expand the transmission area in a captured image are based on a software method and may transmit the expanded image to the counterpart display apparatus 200.

In operation 1180, the display apparatus 100 may perform gesture recognition in an image corresponding to the gesture recognition area which is at least a portion of the non-transmission area and may perform a function corresponding to a recognized gesture.

Digital zoom-in refers to a method of processing the image captured by the camera based on a software method, and thus, the image captured by the camera after the digital zoom-in is executed may be the same as the image captured by the camera before the digital zoom-in is executed. Thus, the display apparatus 100 may perform the gesture recognition in the image corresponding to the gesture recognition area which is at least the portion of the non-transmission area in the image captured by the camera and may perform the function corresponding to the recognized gesture. Referring to FIG. 13, operations 1180 and 1190 are described.

FIG. 13 is a reference diagram for describing an operating method of a data processing device, when a zoom type is digital zoom-in, according to an embodiment of the disclosure.

Because it may be difficult for the display apparatus 100 to separately identify the gesture recognition area in the expanded image 1211, the display apparatus 100 may not perform gesture recognition. Thus, the display apparatus 100 may determine that it is impossible to perform gesture recognition, and in order to notify this to a user, may output a notification indicating that the gesture recognition function has been terminated.

Referring to FIG. 13, the display apparatus 100 may capture an image 1300 of the user by using a camera while a video call function is executed. While the capturing is performed, the display apparatus 100 may identify a zoom type according to a user input of requesting zoom-in, and when the zoom type is digital zoom-in, the display apparatus 100 may expand, based on a software method, an image corresponding to a transmission area 1301 in the image 1300 of the user to obtain an expanded image 1311. In the case of the digital zoom-in, a zoom lens is not used, and software processing performed, and thus, the image 1300 of the user captured by the camera may be the same as the image captured by the camera before the digital zoom-in is executed. Also, the display apparatus 100 may transmit the expanded image 1311 to the counterpart display apparatus 200 so that the expanded image 1311 based on the digital zoom-in may be displayed on a display of the counterpart display apparatus 200. However, the expanded image 1131 based on the digital zoom-in is obtained by simply expanding sizes of frames of a portion of the captured image 1300 of the user, and thus, the resolution of the expanded image 1311 may be greatly reduced, compared to the resolution of the original image 1300 before the expansion.

Also, the display apparatus 100 may identify a gesture recognition area 1302 in the image 1300 of the user and may perform gesture recognition with respect to an image corresponding to the identified gesture recognition area 1302. Also, the display apparatus 100 may perform a function corresponding to a gesture recognized as a result of the gesture recognition.

FIG. 14 is a reference diagram for describing an operating method of a display apparatus, when the display apparatus includes two cameras, according to an embodiment of the disclosure.

Referring to FIG. 14, the display apparatus 100 may include two cameras, that is, a normal camera 162a having no zoom lens and a zoom camera 162b including a zoom lens.

The display apparatus 100 may obtain an image 1400 of the user by capturing the user by using the normal camera 162a in order to provide a video call service. The display apparatus 100 may transmit an image 1410 corresponding to a transmission area identified in the image 1400 of the user, to the counterpart display apparatus 200 to be displayed on a video call screen, and may perform gesture recognition on an image 1420 corresponding to a gesture recognition area identified in the image 1400 of the user, to recognize a gesture and perform a function corresponding to the recognized gesture.

While the display apparatus 100 operates as described above, the display apparatus 100 may receive a user input of requesting zoom-in. In this case, the display apparatus 100 may not only continue photographing the user by using the normal camera 162a, but may also photograph the user by using the zoom camera 162b. The zoom camera 162b may adjust a focal distance of the zoom lens, and thus, may obtain an image 1430 in which the user, who is the object, is expanded. Thus, the display apparatus 100 may transmit, to the counterpart display apparatus 200, the expanded image 143 obtained through the zoom camera 162b in response to the request of the user to execute the zoom-in. Also, according to the gesture recognition operation, a gesture recognition area may be identified in the image 1400 of the user obtained by the normal camera 162a, gesture recognition may be performed on am image 1420 corresponding to the identified gesture recognition area in order to recognize a gesture, and a function corresponding to the recognized gesture may be performed.

As described above, when the display apparatus 100 includes two cameras, that is, the normal camera and the zoom camera, and when the display apparatus 100 provides the video call service and provides also the gesture recognition function, the display apparatus 100 may not deteriorate the quality of the image of the user transmitted to the counterpart display apparatus 200 and may also provide the gesture recognition function, even when the display apparatus 100 executes zoom-in according to a user input of requesting execution of zoom-in.

FIG. 15 illustrates an example of a user interface of a display apparatus which may provide a gesture recognition function while providing a video call service, according to an embodiment of the disclosure.

Referring to FIG. 15, the display apparatus 1500 may display an image 1530 of the other user received from the counterpart display apparatus 200 on a main screen of a display and may display an image 1540 of the user captured by the camera of the display apparatus 1500 on a sub-screen of the display.

Also, the display apparatus 1500 may provide a user interface 1520 for controlling a video call function while a video call service is provided. The user interface 1520 for controlling the video call function may include a mute icon 1521, a voice call icon 1522, and a video call icon 1523

Also, when the display apparatus 1500 provides a gesture recognition function, the display apparatus 1500 may display a gesture guide 1510 for guiding the user with available gestures and functions corresponding thereto. The gesture guide 1510 may include information about one or more gestures available in the gesture recognition function of the display apparatus 1500 and the function corresponding to each of the gestures. Referring to FIG. 15, the gesture guide 1510 may provide a guide that a first function is provided in correspondence to a first gesture, a second function is provided in correspondence to a second gesture, and a third function is provided in correspondence to a third gesture.

The gestures available in the gesture recognition function may include various gestures. In detail, the gestures may include, for example, a gesture using a hand, a gesture using a finger, and/or a gesture using a hand and an arm. For example, the gestures may include various gestures, such as a gesture of waving a hand, a gesture of clenching one's fist, a gesture of moving a hand in upward and down directions, a gesture of moving a hand in right and left directions, a gesture of unfolding one finger, a gesture of unfolding two fingers, a gesture of unfolding three fingers, a gesture of unfolding four fingers, a gesture of unfolding five fingers, a gesture of using two fingers to make an X shape, and/or a gesture of using a thumb and an index finger to make an OK sign.

A function mapped to each gesture may include, for example, a function of controlling the video call function, and/or a function of generally controlling the display apparatus. The function of controlling the video call function may include a mute function, a function of switching a video call to a sound call, a function of switching a sound call to a video call, a function of hiding an image of the user, a function of zoom-in, and/or a function of zoom-out. The function of generally controlling the display apparatus may include, for example, a function of adjusting a volume of the display apparatus.

When the display apparatus 100 provides the video call service, and the display apparatus 100 does not execute the gesture recognition function, the display apparatus 100 may not have to identify the transmission area and the gesture recognition area in the image of the user captured by using the camera. Thus, in this case, the display apparatus 100 may directly transmit the image captured by using the camera to the counterpart display apparatus 200.

When the display apparatus 100 provides the video call service, the display apparatus 100 may not execute the gesture recognition function, and then, may receive a user input of requesting execution of the gesture recognition function. According to the user input of requesting the execution of the gesture recognition function, the display apparatus 100 may perform the operations as described above in this specification, the operations including the operation of identifying the transmission area and the gesture recognition area in the image of the user captured by using the camera.

As described above, when a gesture recognition function is provided while a video call service is provided, an image may be processed and output such that a video call between users is not interrupted by a gesture of a user, and thus, user's satisfaction and user's convenience may be increased.

The operating method of the display apparatus may be implemented as a program command which may be executed by various computer devices and may be recorded on a computer-readable medium. Also, one or more programs including instructions for executing the operating method of the display apparatus may be recorded on a computer-readable recording medium.

The computer-readable medium may separately include, for example, each of a program command, a data file, and/or a data structure, etc. or may include a combination thereof. The program command recorded on the computer-readable medium may be specially designed and constructed or may be known to and usable by one of ordinary skill in the field of computer software. Examples of the computer-readable recording medium include magnetic media, such as hard discs, floppy discs, and magnetic tapes, optical media, such as compact disc-read only memories (CD-ROMs) and digital versatile discs (DVDs), magneto-optical media, such as floptical discs, and hardware devices specially configured to store and execute program commands, such as ROMs, RAMs, and flash memories. Examples of the program command include advanced language codes that may be executed by a computer by using, for example, an interpreter as well as machine language codes made by a compiler.

A machine-readable storage medium may be provided in a form of a non-transitory storage medium. The "non-transitory storage medium" may only indicate that the medium is a tangible device, rather than a signal (for example, an electromagnetic wave), and does not distinguish a semi-permanent storage of data in the storage medium and a temporary storage of data in the storage medium. For example, the "non-transitory storage medium" may include a buffer temporarily storing data.

The operating method of the display apparatus, described in the present specification, may be provided as an inclusion of a computer program product. The computer program product may be, as a product, transacted between a seller and a purchaser. The computer program product may be distributed in the form of a storage medium (for example, a compact disc read-only memory (CD-ROM)), or directly distributed online (e.g., download or upload) through an application store (e.g., Play Store TM) or between two user devices (e.g., smartphones). In the case of the online distribution, at least part of the computer program product (e.g., a downloadable application) may be at least temporarily stored in a machine-readable storage medium, such as a server of a manufacturer, a server of an application store, or a memory of a relay server, or may be temporarily generated.

Particularly, the operating method of the display apparatus may be implemented as a computer program product including a recording medium having stored thereon a program for executing the operating method of the display apparatus.

Although embodiments are described in detail above, the scope of the claims is not limited thereto, and various modifications and alterations by one of ordinary skill in the art using basic concept defined by the following claims are also included in the scope of the claims.

The invention claimed is:

1. A display apparatus comprising:
a display;
a communicator;
a memory storing one or more instructions; and
at least one processor configured to execute the one or more instructions,
wherein the at least one processor is configured to execute the one or more instructions to:
divide a first image captured by a camera for a video call into a transmission area and a non-transmission area, the non-transmission area comprising a gesture recognition area, wherein the transmission area extends from an upper end of the first image and has a height corresponding to a specified percentage of a height of the first image, and wherein the non-transmission area extends from a lower end of the first image and has a height corresponding to a specified percentage of the height of the first image;
control the communicator to transmit a second image including the transmission area and excluding the non-transmission area to a counterpart display apparatus participating in the video call, in order to provide a video call service;
perform gesture recognition in a third image corresponding to the gesture recognition area; and
perform a function corresponding to a recognized gesture from the gesture recognition in the third image.

2. The display apparatus of claim 1, wherein the at least one processor is configured to execute the one or more instructions to identify the gesture recognition area by detecting the gesture recognition area in a specified position of the image area.

3. The display apparatus of claim 1, wherein the at least one processor is configured to execute the one or more instructions to identify the gesture recognition area by:
detecting a hand of a user in the image area; and
determining the gesture recognition area based on an area in which the hand is detected.

4. The display apparatus of claim 1, wherein the at least one processor is further configured to execute the one or more instructions to:
provide a user interface on the display to adjust the gesture recognition area; and
adjust the gesture recognition area based on a user input received through the user interface.

5. The display apparatus of claim 1,
wherein the at least one processor is configured to execute the one or more instructions to perform the gesture recognition in the third image by performing the gesture recognition according to a specified event while the video call service is being provided, and wherein the specified event includes at least one of (i) a user input of selecting the gesture recognition function or (ii) a detection of a motion exceeding a threshold value in the image area.

6. The display apparatus of claim 1, wherein the at least one processor is further configured to execute the one or more instructions to, based on a zoom-in function being executed while the gesture recognition function is provided while the video call service is being provided, identify a category of the zoom-in function.

7. The display apparatus of claim 6, wherein the at least one processor is further configured to execute the one or more instructions to:

based on the category of the zoom-in function being identified as an optical zoom-in, output a message to the display indicating that the gesture recognition function has been terminated, and based on the category of the zoom-in function being identified as digital zoom-in, expand the second image corresponding to the transmission area and control the communicator to transmit, to the counterpart display apparatus participating in the video call, expanded second image, perform the gesture recognition in the third image corresponding to the gesture recognition area, and perform the function corresponding to the recognized gesture from the gesture recognition in the third image.

8. The display apparatus of claim 1, wherein the camera includes a non-zoom camera and a zoom camera, and wherein the at least one processor is further configured to execute the one or more instructions to, based on a zoom-in function being executed while the gesture recognition function is provided while the video call service is being provided, switch the non-zoom camera capturing the first image for the video call to the zoom camera for capturing an expanded first image.

9. The display apparatus of claim 1, wherein the at least one processor is further configured to execute the one or more instructions to, provide a gesture guide that provides one or more gestures and a function corresponding to each of the one or more gestures, in order to guide the user with available gestures.

10. An operating method of a display apparatus, the operating method comprising:

dividing an image area of a first image captured by a camera for a video call into a transmission area and a non-transmission area, the non-transmission area comprising a gesture recognition area, wherein the transmission area extends from an upper end of the first image and has a height corresponding to a specified percentage of a height of the first image, and wherein the non-transmission area extends from a lower end of the first image and has a height corresponding to a specified percentage of the height of the first image;

transmitting a second image including the transmission area and excluding the non-transmission area to a counterpart display apparatus participating in the video call, in order to provide a video call service;

performing gesture recognition in a third image corresponding to the gesture recognition area; and performing a function corresponding to a recognized gesture from the gesture recognition in the third image.

11. The operating method of claim 10, wherein the identifying the gesture recognition area comprises identifying the gesture recognition area in a specified position of the image area.

12. The operating method of claim 10, wherein the identifying the gesture recognition area comprises:

detecting a hand of a user in the image area; and determining the gesture recognition area based on an area in which the hand is detected.

13. The operating method of claim 10, further comprising:

providing a user interface on a display to adjust the gesture recognition area; and adjusting the gesture recognition area based on a user input received through the user.

14. The operating method of claim 10, wherein the performing the gesture recognition in the third image comprises performing the gesture recognition according to a specified event while the video call service is being provided, and wherein the specified event includes at least one of (i) a user input of selecting the gesture recognition function or (ii) a detection of a motion exceeding a threshold value in the image area.

15. The operating method of claim 10, further comprising, based on a zoom-in function being executed while the gesture recognition function is provided while the video call service is being provided, identify a category of the zoom-in function.

16. The operating method of claim 15, further comprising, based on the category of the zoom-in function being identified as an optical zoom-in, outputting a message to the display indicating that the gesture recognition function has been terminated, and based on the category of the zoom-in function being identified as digital zoom-in, expanding the second image corresponding to the transmission area and transmitting, to the counterpart display apparatus participating in the video call, expanded second image, performing the gesture recognition in the third image corresponding to the gesture recognition area, and performing the function corresponding to the recognized gesture from the gesture recognition in the third image.

17. The operating method of claim 10, wherein the camera includes a non-zoom camera and a zoom camera, and wherein the operating method further comprises, based on a zoom-in function being executed while the gesture recognition function is provided while the video call service is being provided, switching the non-zoom camera capturing the first image for the video call to the zoom camera for capturing an expanded first image.

18. The operating method of claim 10, further comprising providing a gesture guide that provides one or more gestures and a function corresponding to each of the one or more gestures, in order to guide the user with available gestures.

19. A non-transitory computer-readable recording medium having stored therein a program for executing an operating method of a display apparatus, the operating method including:

dividing an image area of a first image captured by a camera for a video call into a transmission area and a non-transmission area, the non-transmission area comprising a gesture recognition area, wherein the transmission area extends from an upper end of the first image and has a height corresponding to a specified percentage of a height of the first image, and wherein the non-transmission area extends from a lower end of the first image and has a height corresponding to a specified percentage of the height of the first image;

transmitting a second image including the transmission area and excluding the non-transmission area to a counterpart display apparatus participating in the video call, in order to provide a video call service;

performing gesture recognition in a third image corresponding to the gesture recognition area; and performing a function corresponding to a recognized gesture from the gesture recognition in the third image.

20. The non-transitory computer-readable recording medium of claim 19, wherein the identifying the gesture recognition area includes:

detecting a hand of a user in the image area; and determining the gesture recognition area based on an area in which the hand is detected.

\* \* \* \* \*